United States Patent
Park et al.

(10) Patent No.: US 9,749,613 B2
(45) Date of Patent: Aug. 29, 2017

(54) 3D IMAGE ACQUISITION APPARATUS AND METHOD OF GENERATING DEPTH IMAGE IN THE 3D IMAGE ACQUISITION APPARATUS

(71) Applicant: SAMSUNG ELECTRONICS CO., LTD., Suwon-si (KR)

(72) Inventors: Yong-hwa Park, Yongin-si (KR); Sun-kwon Kim, Yongin-si (KR); Hee-sun Yoon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 708 days.

(21) Appl. No.: 14/247,907

(22) Filed: Apr. 8, 2014

(65) Prior Publication Data

US 2014/0300701 A1 Oct. 9, 2014

(30) Foreign Application Priority Data

Apr. 8, 2013 (KR) ........................ 10-2013-0038287

(51) Int. Cl.
| | |
|---|---|
| *H04N 13/00* | (2006.01) |
| *G01S 17/36* | (2006.01) |
| *H04N 13/02* | (2006.01) |
| *G01S 17/89* | (2006.01) |
| *G06T 5/00* | (2006.01) |

(Continued)

(52) U.S. Cl.
CPC ......... *H04N 13/0271* (2013.01); *G01S 17/36* (2013.01); *G01S 17/89* (2013.01); *G06T 5/003* (2013.01); *G06T 5/50* (2013.01); *H04N 5/23264* (2013.01); *G01S 7/4914* (2013.01);
(Continued)

(58) Field of Classification Search
None
See application file for complete search history.

(56) References Cited

U.S. PATENT DOCUMENTS

| | | |
|---|---|---|
| 4,935,616 A | 6/1990 | Scott |
| 5,081,530 A | 1/1992 | Medina |
| | (Continued) | |

FOREIGN PATENT DOCUMENTS

| | | |
|---|---|---|
| CN | 102822693 A | 12/2012 |
| KR | 10-2010-0132189 A | 12/2010 |
| | (Continued) | |

OTHER PUBLICATIONS

Communication, Issued by the European Patent Office, Dated Jul. 16, 2014, in counterpart European Application No. 14163725.6.

(Continued)

*Primary Examiner* — Kevin McInnish
(74) *Attorney, Agent, or Firm* — Sughrue Mion, PLLC

(57) ABSTRACT

Provided are a three-dimensional (3D) image acquisition apparatus, and a method of generating a depth image in the 3D image acquisition apparatus. The method may include sequentially projecting a light transmission signal, which is generated from a light source, to a subject, modulating reflected light, which is reflected by the subject, using a light modulation signal, calculating a phase delay using a combination of a first plurality of images of two groups, from among a second plurality of images of all groups obtained by capturing the modulated reflected light, and generating a depth image based on the phase delay.

22 Claims, 15 Drawing Sheets

(51) Int. Cl.
*G06T 5/50* (2006.01)
*H04N 5/232* (2006.01)
*G01S 7/491* (2006.01)

(52) U.S. Cl.
CPC ............... *G06T 2207/10016* (2013.01); *G06T 2207/10028* (2013.01); *G06T 2207/20201* (2013.01)

(56) References Cited

U.S. PATENT DOCUMENTS

| | | | |
|---|---|---|---|
| 6,057,909 | A | 5/2000 | Yahav et al. |
| 6,088,086 | A | 7/2000 | Muguira et al. |
| 6,100,517 | A | 8/2000 | Yahav et al. |
| 6,118,946 | A | 9/2000 | Ray et al. |
| 6,331,911 | B1 | 12/2001 | Manassen et al. |
| 6,794,628 | B2 | 9/2004 | Yahav et al. |
| 6,856,355 | B1 | 2/2005 | Ray et al. |
| 7,016,519 | B1 | 3/2006 | Nakamura et al. |
| 7,095,487 | B2 | 8/2006 | Gonzalez-Banos et al. |
| 7,230,685 | B2 | 6/2007 | Suzuki et al. |
| 8,194,303 | B2 | 6/2012 | Park et al. |
| 8,289,606 | B2 | 10/2012 | Park et al. |
| 8,436,370 | B2 | 5/2013 | Park et al. |
| 8,492,863 | B2 | 7/2013 | Cho et al. |
| 2010/0182671 | A1 | 7/2010 | Park |
| 2010/0290674 | A1* | 11/2010 | Kim ..................... G01S 17/89 382/106 |
| 2010/0308211 | A1 | 12/2010 | Cho et al. |
| 2010/0321755 | A1 | 12/2010 | Cho et al. |
| 2010/0328750 | A1 | 12/2010 | Kim et al. |
| 2011/0074659 | A1 | 3/2011 | Park et al. |
| 2011/0164132 | A1* | 7/2011 | Buettgen ................. G01S 17/36 348/135 |
| 2011/0176709 | A1 | 7/2011 | Park et al. |
| 2011/0292370 | A1 | 12/2011 | Hills et al. |
| 2011/0304841 | A1* | 12/2011 | Bamji ................... G01S 7/4914 356/5.01 |
| 2012/0069176 | A1 | 3/2012 | Park et al. |
| 2012/0098935 | A1* | 4/2012 | Schmidt ................. G01S 17/89 348/46 |
| 2012/0162197 | A1* | 6/2012 | Park ....................... G01S 17/89 345/419 |
| 2014/0049767 | A1* | 2/2014 | Benedetti ............... G01S 17/89 356/5.1 |

FOREIGN PATENT DOCUMENTS

| | | |
|---|---|---|
| KR | 10-2012-0020054 A | 3/2012 |
| KR | 10-2012-0061379 A | 6/2012 |
| KR | 10-2012-0069406 A | 6/2012 |
| KR | 10-2012-0071970 A | 7/2012 |
| KR | 10-2012-0075182 A | 7/2012 |
| KR | 10-2012-0077417 A | 7/2012 |
| KR | 10-2012-0111092 A | 10/2012 |
| KR | 10-2012-0130937 A | 12/2012 |

OTHER PUBLICATIONS

Radke, R.J. et al., "Image Change Detection Algorithms: A Systematic Survey", IEEE Transactions on Image Processing, vol. 14, No. 3, Mar. 2005, pp. 294-307.

Communication dated Feb. 13, 2017, issued by the State Intellectual Property Office of P.R. China in counterpart Chinese Application No. 201410138665.9.

* cited by examiner

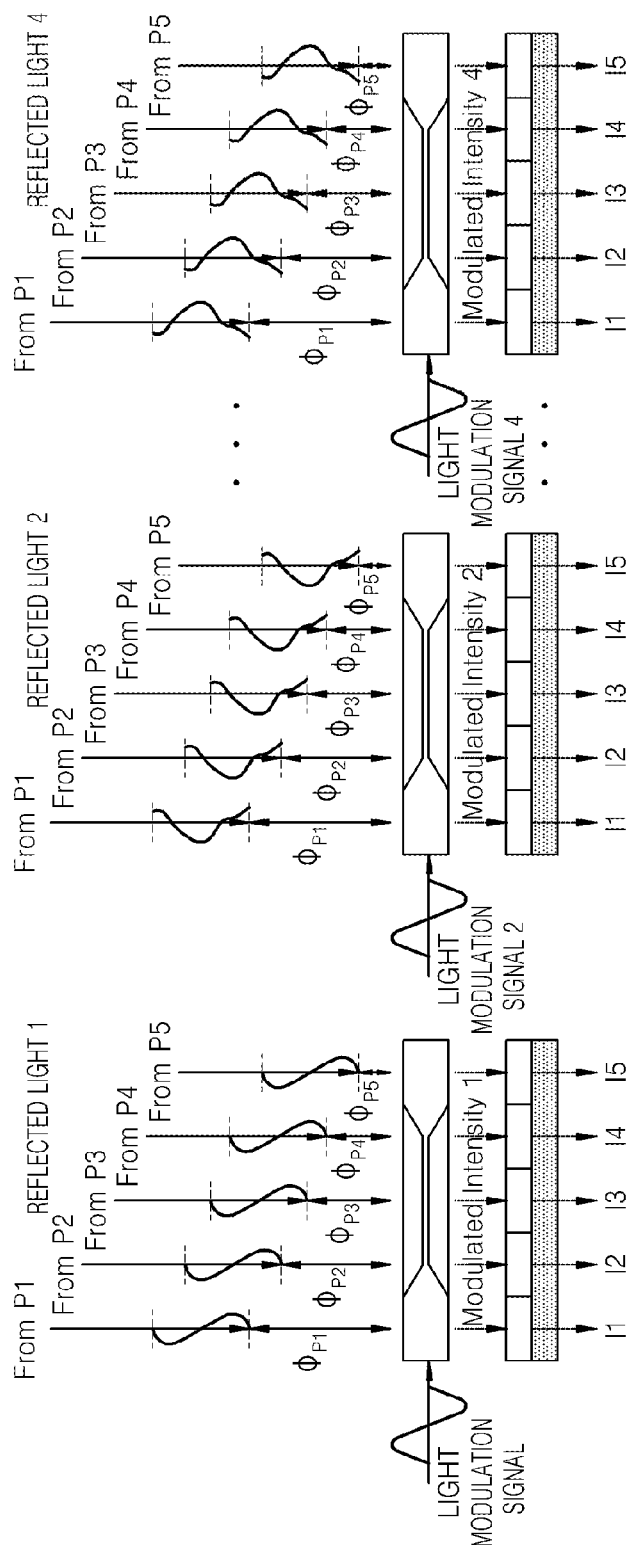

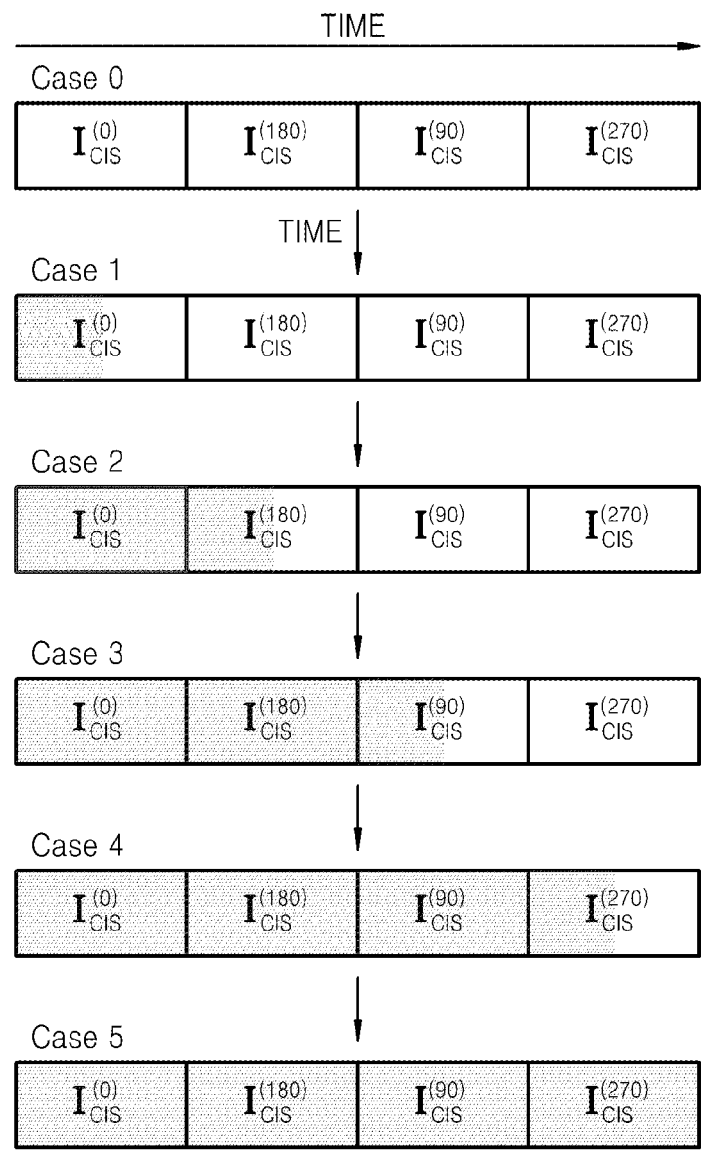

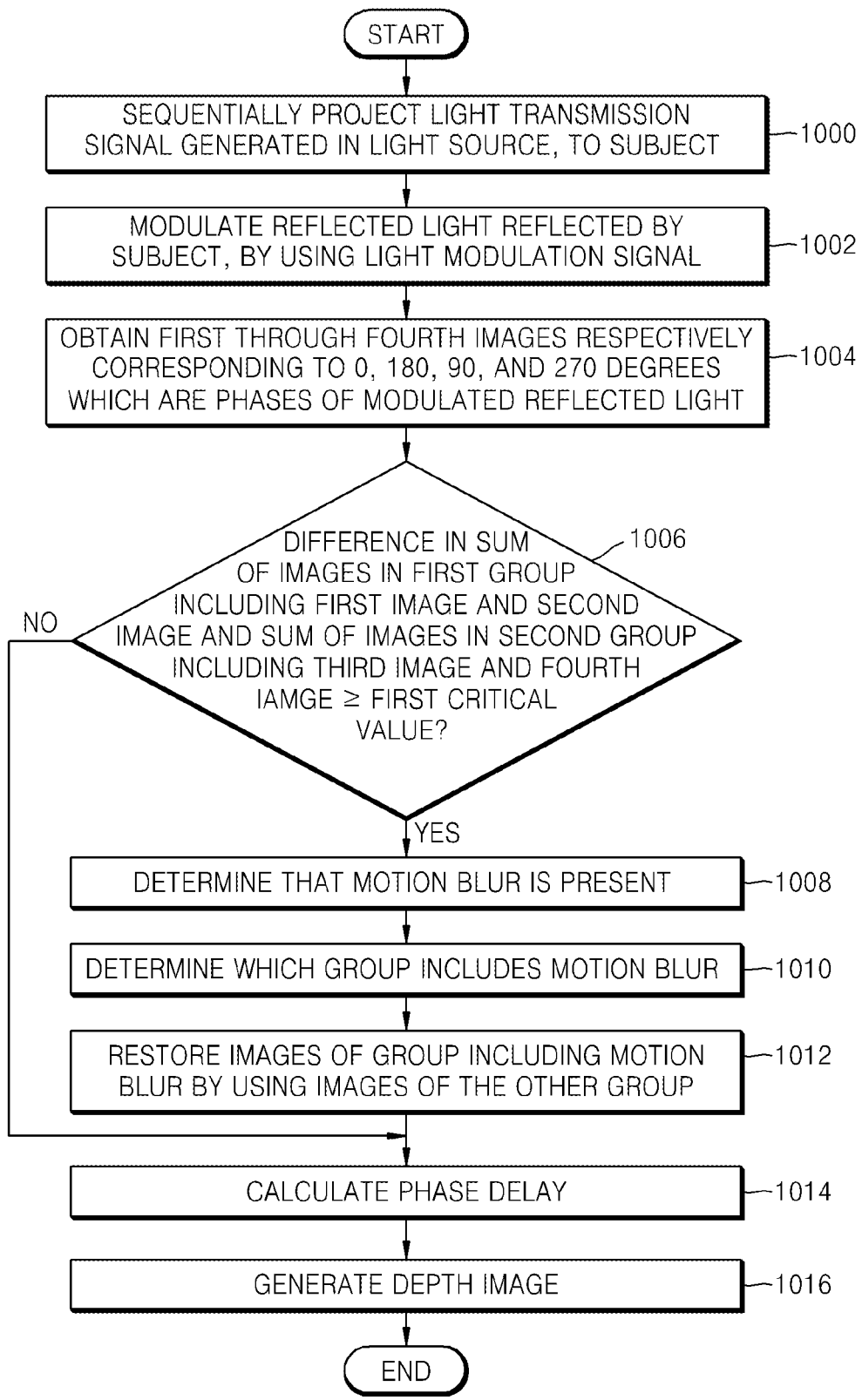

Original Depth

Deblured Depth

3D IMAGE ACQUISITION APPARATUS AND METHOD OF GENERATING DEPTH IMAGE IN THE 3D IMAGE ACQUISITION APPARATUS

CROSS-REFERENCE TO RELATED APPLICATIONS

This application claims priority from Korean Patent Application No. 10-2013-0038287, filed on Apr. 8, 2013, in the Korean Intellectual Property Office, the disclosure of which is incorporated herein in its entirety by reference.

BACKGROUND

1. Field

Exemplary embodiments relate to three-dimensional (3D) image acquisition apparatuses and methods of generating a depth image by using the 3D image acquisition apparatuses.

2. Description of the Related Art

Research has been increasing in the fields of three-dimensional (3D) cameras or light detection and ranging (LIDAR) techniques for capturing distance information of an object. Further, one of these techniques is a time-of-flight (TOF) method which measures a traveling time of light by measuring a distance between a capturing unit and a subject (hereinafter referred to as "depth image").

In the TOF method, light of a predetermined wavelength, e.g., near-infrared (NIR) (850 nm) is projected to a subject using a light-emitting diode (LED) or a laser diode (LD), and light of the same wavelength reflected from the subject is measured or captured using a photodiode or a camera. Thus, the TOF method may extract a depth image. Various TOF technologies have been introduced which include a series of various optical processes, such as projection of light from a light source, reflection of a subject, optical modulation, capturing, and processing.

For example, an optical shutter method is a method in which light of a predetermined wavelength (e.g., NIR 850 nm) is projected to a subject using an LED or LD, and an optical image obtained from light of the same wavelength reflected from the subject is optically modulated using an image intensifier or a predetermined solid state modulator. An image is captured using an image sensor, such as a photodiode (PD), a charge-coupled device (CCD), or complementary metal oxide semiconductor (CMOS) image sensor (CIS), included at a rear end of the image intensifier or the solid state modulator. An intensity value of the image is processed to obtain a depth image. To identify a phase difference or traveled time according to the distance of light, a high light modulation rate of about several tens to several hundreds of MHz is required. To obtain the high light modulation rate, an image intensifier may be used which includes a multi-channel plate (MCP) or a GaAs-based solid state modulator. In a related art, a GaAs-based modulator device has been released with improved characteristics and a thin-type modulator using an electro-optic material has been released.

In regard to an optical process for extracting a depth image or depth information, a method of driving a light source and a light modulator, a method of using a particular waveform, such as a triangular wave (ramp wave), and a method using a sine wave have been introduced. Methods of driving a light source and a light modulator according to respective waveforms and methods of extracting and calculating a depth image based on intensity values of captured images, i.e., various depth algorithms, have been introduced.

Noise or signal distortion in a light source, a light modulator, or a capturing device (CCD or CIS) used in 3D cameras usually occurs. Therefore, the noise or signal distortion may cause an error in a depth image. To remove the noise or signal distortion, a noise component has to be removed using an appropriate device. In the related art, a method of using a higher order of a sine wave, which is a particular waveform, a method of using a code division multiple access (CDMA) method, or a method of removing random error is known to remove noise or signal distortion.

In a related art, a 3D camera using a TOF method generates one depth image by sequentially obtaining four infrared (IR) images using driving signals basically having different phases, e.g., 0, 90, 180, and 270 degrees. Motion blur is caused when capturing times of the four IR images are different from one another. In other words, as four IR images of a moving object are sequentially captured, a subject of some pixels (or images) may change, or an object of different depth information instead of the same depth information might be captured, during the whole capturing time of the four images. A frequency of motion blur is high on a boundary surface of the moving object. Further, the frequency of motion blur is also high when the object moves fast or when capturing occurs relatively slowly.

The motion blur in a depth image has different consequences in comparison to a typical motion blur. A consequence of the typical motion blur is an average image at the boundary surface of the moving object, e.g., average luminance or color with respect to other objects such as the object and the background thereof. However, instead of the average of depth images obtained for the typical motion blur, divergence is generated in calculation operations in regard to motion blur of a camera for obtaining the depth image. Thus, unexpected results are derived in regard to the motion blur of the camera. Accordingly, it is important to remove the motion blur.

SUMMARY

Exemplary embodiments may provide three-dimensional (3D) image acquisition apparatuses for improving a rate of capturing a depth image by generating one depth image using a combination of two groups of images.

Exemplary embodiments may provide methods of generating a depth image in a 3D image acquisition apparatus. When a moving object is captured using a time-of-flight (TOF) method, a depth image is generated after detecting and restoring portions of motion blur, such as an edge, which is inevitably caused, so as to prevent divergence of the depth image due to the motion blur. Further, exemplary embodiments may include a light source, a light modulator, or a capturing device, which are used in related art operations for generating a depth image, so no additional costs of additional devices are incurred. Since no additional devices are used, additional computations may be reduced.

Additional aspects will be set forth in part in the description which follows and, in part, will be apparent from the description, or may be learned by practice of the presented embodiments.

According to an aspect of the exemplary embodiments, a method of generating a depth image, includes: sequentially projecting a light transmission signal, which is generated from a light source, to a subject; modulating reflected light, which is reflected by the subject, using a light modulation signal; calculating a phase delay using a combination of a first plurality of images of two groups, from among a second plurality of images of all groups obtained by capturing the modulated reflected light; and generating a depth image based on the phase delay.

According to another aspect of the exemplary embodiments, a method of generating a depth image, includes: sequentially projecting a light transmission signal, which is generated in a light source, to a subject; modulating reflected light, which is reflected by the subject, using a light modulation signal; obtaining a first image corresponding to 0 degrees, a second image corresponding to 180 degrees, a third image corresponding to 90 degrees, and a fourth image corresponding to 270 degrees, wherein 0 degrees, 180 degrees, 90 degrees, and 270 degrees are phases of the modulated reflected light; determining whether a motion blur image generated by motion of the subject is present by determining whether a difference between a first sum of images in the first group which includes the first image and the second image and a second sum of images in the second group which includes the third image and the fourth image is equal to or greater than a first critical value; determining, when there is a motion blur image, a group including the motion blur image by comparing a difference of images in the first group and a difference of images in the second group, and restoring the images of the group including the motion blur image using images of the other group; calculating a phase delay using the images of the other group and the images of the restored group; and generating a depth image based on the phase delay.

According to another aspect of the exemplary embodiments, a three-dimensional (3D) image acquisition apparatus includes: a light source configured to sequentially project a light transmission signal to a subject; a light modulator configured to modulate reflected light which is reflected by the subject, using a light modulation signal having a gain waveform; a capturing device configured to capture the modulated reflected light, which is modulated by the light modulator, to generate a plurality of second images; and a depth image processor configured to calculate a phase delay using a combination of a plurality of first images of two groups, from among the second plurality of images of all groups generated using the capturing device, and generating a depth image based on the phase delay.

According to another aspect of the exemplary embodiments, a method of restoring an image which includes motion blur includes: determining whether a motion blur image occurs in a reflected light signal by determining whether a difference between a first sum of images in a first group and a second sum of images in a second group is equal to or greater than a first critical value; determining a group which includes the motion blur image by comparing a difference of images in the first group and a difference of images in the second group in response to the motion blur image occurring in the reflected light signal; and restoring images of the group which includes the motion blur image using images of the other group which is not the group including the motion blur image. The first group includes a first image and a second image of the reflected light signal, and the second group includes a third image and a fourth image of the reflected light signal. The first image, the second image, the third image, and the fourth image each have different phases.

BRIEF DESCRIPTION OF THE DRAWINGS

The patent or application file contains at least one drawing executed in color. Copies of this patent or patent application publication with color drawings will be provided by the Office upon request and payment of the necessary fee.

These and/or other aspects will become apparent and more readily appreciated from the following description of the embodiments, taken in conjunction with the accompanying drawings in which:

FIGS. 2A through 2D illustrate an operation of generating four different images (sub-frames) by using a capturing device after projecting four different light transmission signals to a subject from a light source, according to another embodiment;

FIGS. 8A and 8B are schematic views for explaining an operation of restoring motion blur by using an image processor according to another embodiment;

FIG. 10 is a flowchart illustrating a method of generating a depth image by using a 3D image acquisition apparatus, according to another embodiment;

DETAILED DESCRIPTION OF THE EXEMPLARY EMBODIMENTS

Figure 1:
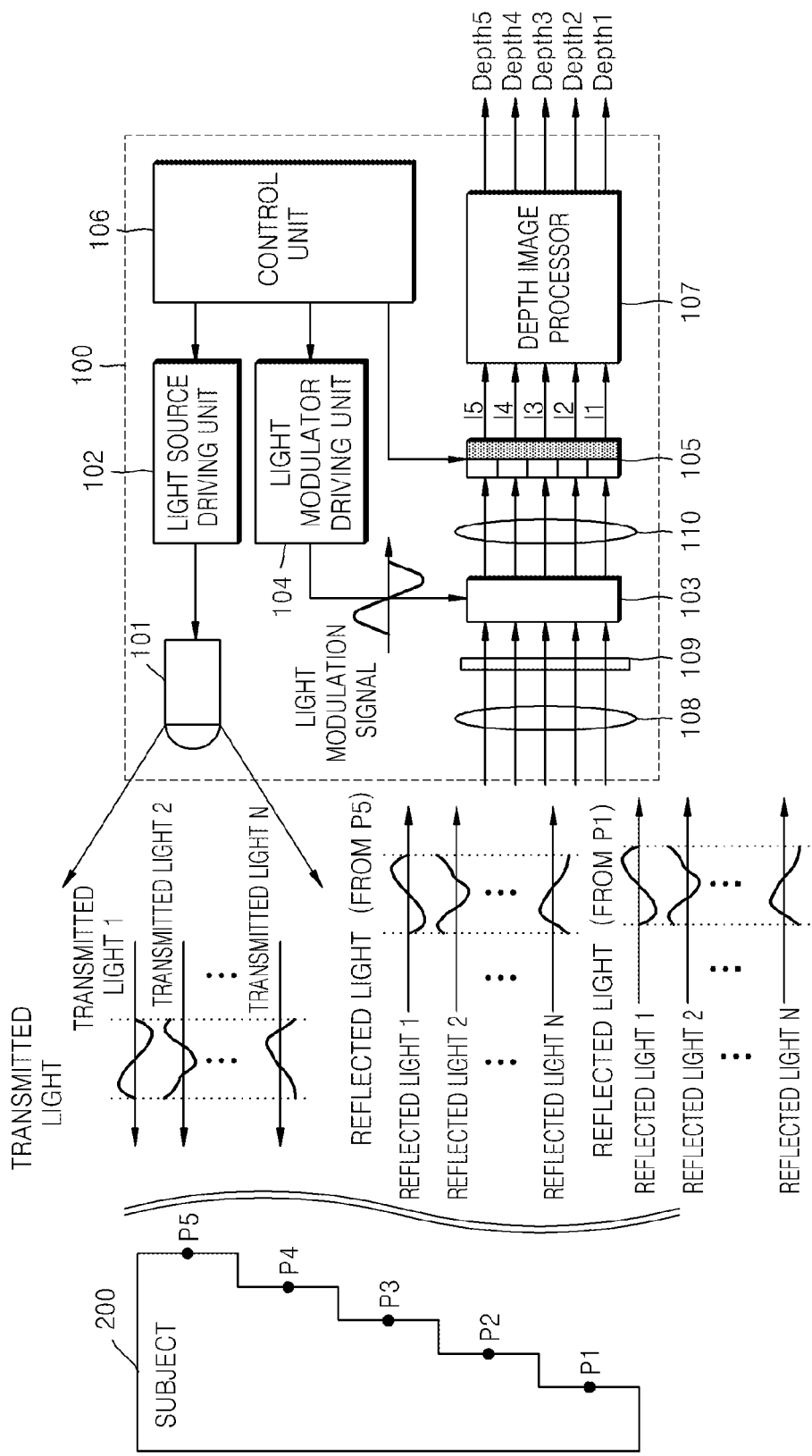
FIG. 1 is a schematic structural diagram illustrating a three-dimensional (3D) image acquisition apparatus for generating a depth image by using a time-of-flight (TOF) method, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

As the exemplary embodiments allow for various changes and numerous embodiments, particular embodiments will be illustrated in the drawings and described in detail in the written description. However, this is not intended to limit the exemplary embodiments to particular modes of practice, and it is to be appreciated that all changes, equivalents, and substitutes that do not depart from the spirit and technical scope are encompassed in the exemplary embodiments. In the description of the exemplary embodiments, certain detailed explanations of related art are omitted when it is deemed that they may unnecessarily obscure the essence of the exemplary embodiments.

While such terms as "first, "second", etc., may be used to describe various components, such components must not be limited to the above terms. The above terms are used only to distinguish one component from another.

The terms used in the present specification are merely used to describe particular embodiments, and are not intended to limit the exemplary embodiments. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The embodiments will be described below in more detail with reference to the accompanying drawings. Those components that are the same or are in correspondence are rendered the same reference numeral regardless of the figure number, and redundant explanations are omitted.

FIG. 1 is a schematic structural diagram illustrating a three-dimensional (3D) image acquisition apparatus 100 for generating a depth image using a time-of-flight (TOF) method, according to an embodiment.

Referring to FIG. 1, the 3D image acquisition apparatus 100 may include a light source 101 that emits light of a predetermined wavelength, a light source driving unit 102 that drives the light source 101, a light modulator 103 that modulates light reflected by a subject 200, a light modulator driving unit 104 that drives the light modulator 103, a capturing device 105 that generates an image from the light modulated by the light modulator 103, a depth image processor 107 that generates a depth image based on an output of the capturing device 105, and a control unit 106 that controls operations of the light source driving unit 102, the light modulator driving unit 104, the capturing device 105, and the depth image processor 107. Also, a first lens 108, through which the reflected light is to be focused in an area of the light modulator 103, and a filter 109 that passes through only light having a predetermined wavelength and removes background light or miscellaneous light may be further disposed on a light incident surface of the light modulator 103. In addition, a second lens 110 that focuses the modulated light in an area of the capturing device 105 may be further disposed between the light modulator 103 and the capturing device 105.

The light source 101 may be, e.g., a light-emitting diode (LED) or a laser diode (LD), which may emit near infrared (NIR) light having a wavelength of about 850 nm that is not visible to human eyes, for safety. However, the bands of wavelengths and types of light sources are not limited thereto. The light source driving unit 102 may drive the light source 101 according to a control signal received from the control unit 106, e.g., in an amplitude modulation manner or a phase modulation manner. A light transmission signal that is projected to the subject 200 from the light source 101 may have a periodic continuous function having a predetermined period according to a driving signal of the light source driving unit 102. For example, the light transmission signal may have a waveform that is specifically defined, such as a sine wave, a ramp wave, or a square wave, but may also be a typical, undefined waveform.

The light modulator 103 modulates light reflected by the subject 200 according to a control of the light modulator driving unit 104. The light modulator driving unit 104 drives the light modulator 103 according to a control signal received from the control unit 106. For example, the light modulator 103 may modulate an amplitude of the reflected light by varying a gain of the reflected light according to a light modulation signal having a predetermined wavelength that is provided by the light modulator driving unit 104. Therefore, the light modulator 103 has a variable gain. The light modulator 103 may operate at a relatively high light modulation speed of about several tens to several hundreds MHz in order to identify a phase difference or traveling time of light according to distance. The light modulator 103 may be, e.g., an image intensifier tube including a multi-channel plate (MCP), a GaAs-based solid state modulator, or a thin-type modulator formed using an electro-optic material. While the light modulator 103 of a transmission type is illustrated in FIG. 1, a reflective-type light modulator may also be used.

The capturing device 105 generates an image by detecting the reflected light that is modulated by the light modulator 103 according to a control of the control unit 106. When only a distance to a predetermined point of the subject 200 is to be measured, the capturing device 105 may be, e.g., a single optical sensor, such as a photodiode or an integrator. However, when distances to multiple points on the subject 200 are to be measured at the same time, the capturing device 105 may have one dimension or a two-dimensional array including a plurality of photodiodes or other optical detectors. For example, the capturing device 105 may be a charge-coupled device (CCD) image sensor or a complementary metal oxide semiconductor (CMOS) image sensor (CIS) having a two-dimensional array.

The depth image processor 107 generates a depth image according to a depth image generating algorithm, based on an output of the capturing device 105. The depth image processor 107 may be, e.g., an exclusive integrated circuit (IC), or may be software installed in the 3D image acquisition apparatus 100. When the depth image processor 107 is software, the depth image processor 107 may be stored in a separate portable storage medium.

Hereinafter, an operation of the 3D image acquisition apparatus 100 having the above-described structure will be briefly described. According to an embodiment, transmitted light or a light transmission signal of the light source 101 is in the form of a continuous function having a predetermined period, such as a sine wave or a square wave, and has different phases. In other words, the transmitted light or the light transmission signal is controlled to have the same waveforms but different phases according to a control signal of the control unit 106. While the transmitted light of the light source 101 formed to have four different phases has been described above, transmission light of the light source 101 having the same phase and light modulation signals of the light modulator 103 having four different phases may also be formed. Also, the light transmission signals of four different phases are sequentially projected in the order of 0, 180, 90, and 270 degrees. This description will focus on sequential projection of light transmission signals having four different phases in the order of 0, 180, 90, and 270 degrees.

The light source 101 sequentially projects four different beams of transmitted light having predetermined periods and waveforms to the subject 200 according to a control of the control unit 106 and the light source driving unit 102. For example, transmitted light 1 (0 degrees) is generated and projected to the subject 200 during a time period T1. Then, transmitted light 2 (180 degrees) is generated and projected to the subject 200 during a next time period T2. Then, transmitted light 3 (90 degrees) is generated and projected to the subject 200 during a time period T3. Then, transmitted light 4 (270 degrees) is generated and projected to the subject 200 during a time period T4. The transmitted lights which are sequentially projected to the subject 200 may be in the form of a continuous function having a predetermined period, such as a sine wave.

After the transmitted light projected to the subject 200 is reflected on a surface of the subject 200, the transmitted light is incident to the first lens 108. The subject 200 typically has multiple surfaces having different distances from the 3D image acquisition apparatus 100, i.e., different depths. For a simplified description, the subject 200 illustrated in FIG. 1 has five surfaces P1 to P5 with different depths. As the transmitted light is reflected by each of the five surfaces P1 to P5 having different depths, five reflected light beams that are differently delayed in time (i.e., of different phases) are respectively generated. For example, as the transmitted light 1 is reflected on the five surfaces P1 to P5 of the subject 200, five beams of the reflected light 1 having different phases are generated. As the transmitted light 2 is reflected on the five surfaces P1 to P5 of the subject 200, five beams of the reflected light 2 having different phases are generated. Also, the transmitted light 4 is reflected by the five surfaces P1 to P5 to generate five beams of the reflected light 4 having different phases. The reflected light reflected by the surface P1 that is the farthest from the 3D image acquisition apparatus 100 is phase-delayed by $\phi_{P1}$ to arrive at the first lens 108. The reflected light reflected on the surface P5 that is the closest to the 3D image acquisition apparatus 100 is phase-delayed by $\phi_{P5}$ which is less than $\phi_{P1}$ to arrive at the first lens 108.

The first lens 108 focuses the reflected light in an area of the light modulator 103. The filter 109, that transmits only light having a predetermined wavelength, may be disposed between the first lens 108 and the light modulator 103 to remove background light or miscellaneous light other than light of a wavelength used. For example, when the light source 101 emits light having an NIR wavelength of about 850 nm, the filter 109 may be an IR band pass filter that transmits the NIR wavelength band of about 850 nm. Accordingly, light incident to the light modulator 103 may be mainly light that is emitted from the light source 101 and reflected by the subject 200. While the filter 109 is disposed between the first lens 108 and the light modulator 103, the positions of the first lens 108 and the filter 109 may be exchanged. For example, NIR light that has first transmitted through the filter 109 may be focused on the light modulator 103 through the first lens 108.

The light modulator 103 modulates the reflected light to a light modulation signal having a predetermined wavelength. A period of a gain waveform in the light modulator 103 may be the same as a period of a waveform. Referring to FIG. 1, the light modulator 103 may modulate the five beams of reflected light 1 that are respectively reflected by the five surfaces P1 to P5 of the subject 200 and provide the same to the capturing device 105. The light modulator 103 may also sequentially modulate the five beams of each of the reflected light 2 through 5 and provide the same to the capturing device 105.

Light, whose amplitude is modulated using the light modulator 103, passes through the second lens 110. Here, a magnification of the light is adjusted and the light is refocused. Then, the light arrives at the capturing device 105. Accordingly, the modulated light is focused in an area of the capturing device 105 through the second lens 110. The capturing device 105 generates an image by receiving the modulated light during an exposure time. For example, as indicated in FIG. 2A, the capturing device 105 receives the five beams of the reflected light 1, which are respectively reflected on the five surfaces P1 to P5 of the subject 200 and then modulated, for a predetermined period of exposure time to generate an image 1 (CIS image 1). Next, as illustrated in FIG. 2B, the capturing device 105 receives the five beams of the reflected light 2, which are respectively reflected on the five surfaces P1 to P5 of the subject 200 and then modulated, for a predetermined period of exposure time to generate an image 2 (CIS image 2). Finally, by repeating the above operations, as illustrated in FIG. 2C, the capturing device 105 receives the five beams of the reflected light 4, which are respectively reflected on the five surfaces P1 to P5 of the subject 200 and then modulated, for a predetermined period of exposure time to generate an image 4 (CIS image 4). In this manner, as shown in FIG. 2D, four different images may be sequentially obtained. The images 1 through 4 may each be a sub-frame image for generating an image of a frame having depth information. For example, when assuming a period of a frame of depth information to be Td, an exposure time in the capturing device 105 to obtain the four images 1 through 4 may be about Td/4.

Referring to FIG. 2A, in a first sub-frame, the transmitted light 1 projected from the light source 101 to the subject 200 is reflected by the five surfaces P1 to P5 of the subject 200 to generate five beams of the reflected light 1. The five beams of the reflected light 1 are modulated using the light modulator 103, and then arrive at the capturing device 105. In FIG. 2, for convenience of description, the capturing device 105 includes only five pixels respectively corresponding to the five surfaces P1 to P5. Accordingly, the five beams of the reflected light 1 may be respectively incident on the corresponding five pixels. As illustrated in FIG. 2A, the five beams of the reflected light 1 respectively reflected on the surfaces P1 to P5 have different phase delays $\phi_{P1}$ to $\phi_{P5}$ according to the distance from the 3D image acquisition apparatus 100 to the surfaces P1 to P5. For example, the capturing device 105 may generate an image 1 by capturing the reflected light 1 during an exposure time of about Td/4. In the same manner as described above, as illustrated in FIGS. 2B and 2C, different phase delays $\phi_{P1}$ to $\phi_{P5}$ are generated on the five surfaces P1 to P5 with different depths from a second sub-frame to a fourth sub-frame.

Figures 3A, 3B, 3C, 3D:
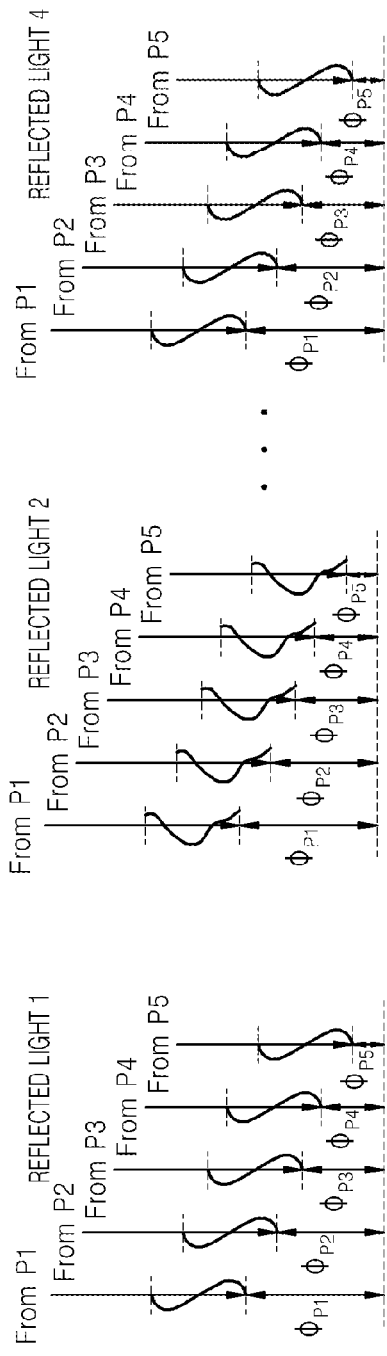
FIGS. 3A through 3D illustrate an operation of generating four different images (sub-frames) after modulating reflected light by using four different light modulation signals by using a light modulator, according to another embodiment.

While four different light transmission signals are transmitted to a subject and four different images (sub-frames) are generated using a capturing device in FIGS. 2A through 2D, identical transmission light may be used in each sub-frame, and the light modulator 103 may modulate reflected light to different gain waveforms for each of the sub-frames. FIG. 3 illustrates an operation of generating four different images (sub-frames) after modulating the reflected light using four different light modulation signals in the light modulator 103, according to another embodiment. Referring to FIG. 3, the reflected light reflected by the subject 200 has the same waveform and phase in each sub-frame. As described above, there are different phase delays $\phi_{P1}$ to $\phi_{P5}$ in the reflected light of each sub-frame according to the surfaces P1 to P5 of the subject 200. As illustrated in FIGS. 3A through 3C, in the first sub-frame, the light modulator 103 modulates the reflected light using a light modulation signal 1 (0 degrees). In the second sub-frame, the light modulator 103 modulates the reflected light using a light modulation signal 2 (180 degrees) having a different phase from that of the light modulation signal 1. Although not illustrated in FIGS. 3A through 3D, in the third sub-frame, the light modulator 103 modulates the reflected light to a light modulation signal 3 (90 degrees) having another different phase. In the fourth sub-frame, the light modulator 103 modulates the reflected light to another light modulation signal 4 (270 degrees). Here, the light modulation signals 1 through 4 are signals having different phases of 0, 180, 90, and 270 degrees. Also, the light modulation signals 1 through 4 may have the same periods and waveforms. Then, as illustrated in FIG. 3D, four different images 1 through 4 may be obtained. In FIGS. 2 and 3, while the modulated images are labeled as CIS images 1 through 4, as described above, the capturing device 105 is not limited to a CIS.

The four images, obtained by projecting the light transmission signals having different phases (0, 180, 90, and 270 degrees) as illustrated in FIG. 2 or by using the light modulation signals 1 through 4 having different phases (0, 180, 90, and 270 degrees) as illustrated in FIG. 3, are transmitted to the depth image processor 107. The depth image processor 107 generates a depth image or depth information according to an algorithm, based on the four images. Also, according to another embodiment, in order to effectively remove motion blur that has occurred due to motion of a subject, the depth image processor 107 performs an algorithm for determining whether motion blur has occurred in the four images (the first image corresponding to 0 degrees, the second image corresponding to 180 degrees, the third image corresponding to the third image, and the fourth image corresponding to 270 degrees). When motion blur is generated, an algorithm is performed in the depth image processor 107 for restoring an image or a pixel in which the motion blur is generated.

Figure 4:
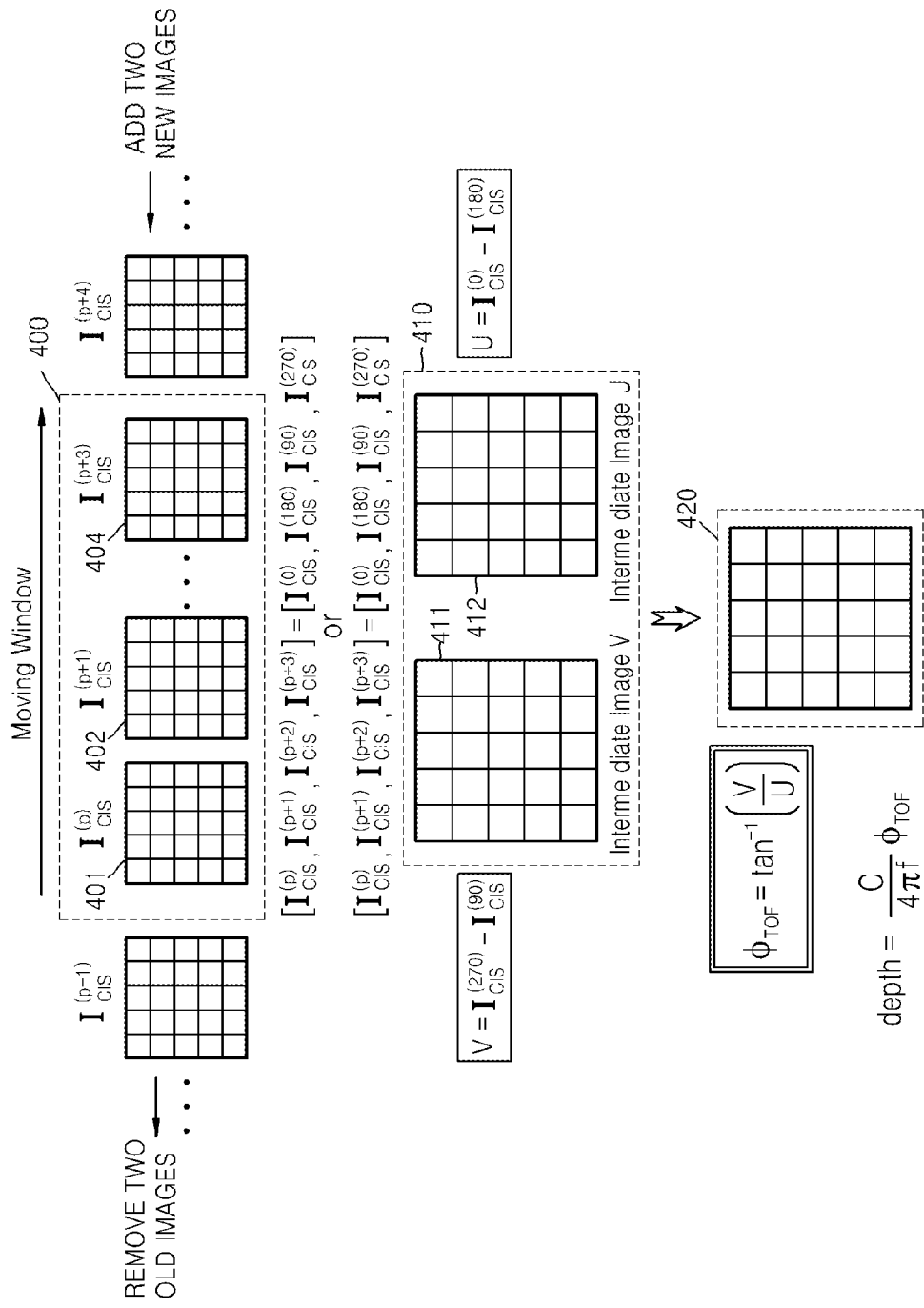
FIG. 4 illustrates an operation of generating a depth image by using a moving window method according to another embodiment.

FIG. 4 illustrates an operation of generating a depth image by using a moving window method according to another embodiment.

As illustrated in FIGS. 2 and 3, four sequentially captured intensity images 1 through 4 are used by the depth image processor 107 in generating a depth image. The four captured images ($I_{CIS}^{(0)}$, $I_{CIS}^{(180)}$, $I_{CIS}^{(90)}$, $I_{CIS}^{(270)}$) have different phases of 0, 180, 90, and 270 degrees in regard to a light source and are labeled CIS. The capturing device 105 illustrated in FIG. 1 (not limited to a CIS) generates a depth image based on the four intensity images 1 through 4.

As illustrated in FIG. 4, four images are obtained using a moving window method. To capture an image, images are consecutively obtained in an order illustrated in Formula 1 below.

$$\ldots \rightarrow I_{CIS}^{(0)} \rightarrow I_{CIS}^{(180)} \rightarrow I_{CIS}^{(90)} \rightarrow I_{CIS}^{(270)} \rightarrow I_{CIS}^{(0)} \rightarrow I_{CIS}^{(180)} \rightarrow \ldots \quad \text{[Formula 1]}$$

In other words, a subject is captured in an order of 0, 180, 90, and 270 degrees to obtain consecutive images. As illustrated in FIG. 4, the four images including $I_{CIS}^{(0)}$, $I_{CIS}^{(180)}$, $I_{CIS}^{(90)}$, $I_{CIS}^{(270)}$ are combined (400) such that two new images are captured and two prior images are sequentially removed. Therefore, a combination of images are obtained as expressed in Equation 2 below:

$$[I_{CIS}^{(p)}, I_{CIS}^{(p+1)}, I_{CIS}^{(p+2)}, I_{CIS}^{(p+3)}] = [I_{CIS}^{(0)}, I_{CIS}^{(180)}, I_{CIS}^{(90)}, I_{CIS}^{(270)}] \quad \text{[Equation 2]}$$

or $$[I_{CIS}^{(p)}, I_{CIS}^{(p+1)}, I_{CIS}^{(p+2)}, I_{CIS}^{(p+3)}] = [I_{CIS}^{(90)}, I_{CIS}^{(270)}, I_{CIS}^{(0)}, I_{CIS}^{(180)}],$$

where p is an arbitrary number.

The four images obtained by using the moving window method are divided into two groups, i.e., first and second groups U and V (410). The first group U is divided into $I_{CIS}^{(0)}$ and $I_{CIS}^{(180)}$, and the second group V is divided into $I_{CIS}^{(90)}$ and $I_{CIS}^{(270)}$. Intermediate images 411 and 412 illustrated in FIG. 4 are formed based on a difference between images of the first group U and images of the second group V.

A depth image is calculated according to Equation 3 using the combination of the images of Equation 2. The first group U includes $I_{CIS}^{(0)}$ and $I_{CIS}^{(180)}$, and the second group V includes $I_{CIS}^{(90)}$ and $I_{CIS}^{(270)}$.

$$\Rightarrow \text{depth} = \frac{c}{4\pi f} \tan^{-1}\left(\frac{-I_{CIS}^{(90)} + I_{CIS}^{(270)}}{I_{CIS}^{(0)} - I_{CIS}^{(180)}}\right) \quad \text{[Formula 3]}$$

As expressed in Equation 3 above, by generating a depth image using the combination of two groups from among four images, one depth image may be obtained in a time period for obtaining two images (i.e., in a moving window method in which two images are captured and two previously captured images are removed from among a plurality of sequentially obtained images). This is advantageous in that a depth image may be obtained at a higher speed than an example where one depth image is obtained after four images are captured in the related art.

In the above-described embodiment, image extraction by using pixels arranged in a 2D array has been described. However, according to another embodiment, a usage range of the embodiments is not limited by whether pixels are arranged in a one-dimensional array or whether a single pixel is used. For example, when measuring a distance of a single pixel, a photodiode or an integrator may be used instead of a CIS.

Hereinafter, a method of removing motion blur in a 3D image acquisition apparatus that is capable of generating a TOF-based depth image will be described. The essential reason that motion blur is caused is an abrupt change in luminance of a subject or surface in an IR image capturing section of four IR images. Thus, a method of detecting (determining) a pixel (or image) in which motion blur has occurred will be described. Then, a method of detecting (determining) a portion of the section where the subject does not change to generate a depth image based on the detected portion and remove divergence in an operation due to the motion blur will be described.

Figure 5:
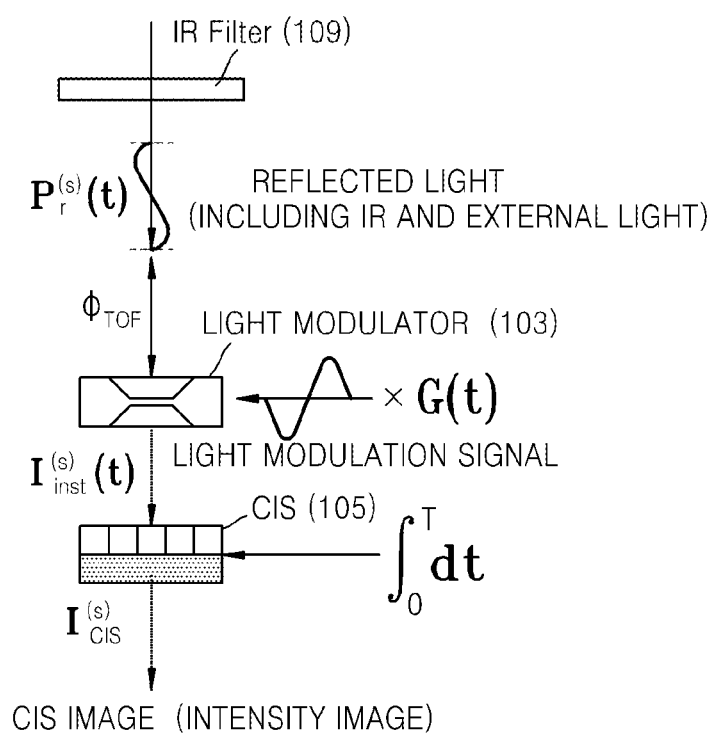
FIG. 5 illustrates a flow of an optical process according to another embodiment.
Figure 6A:
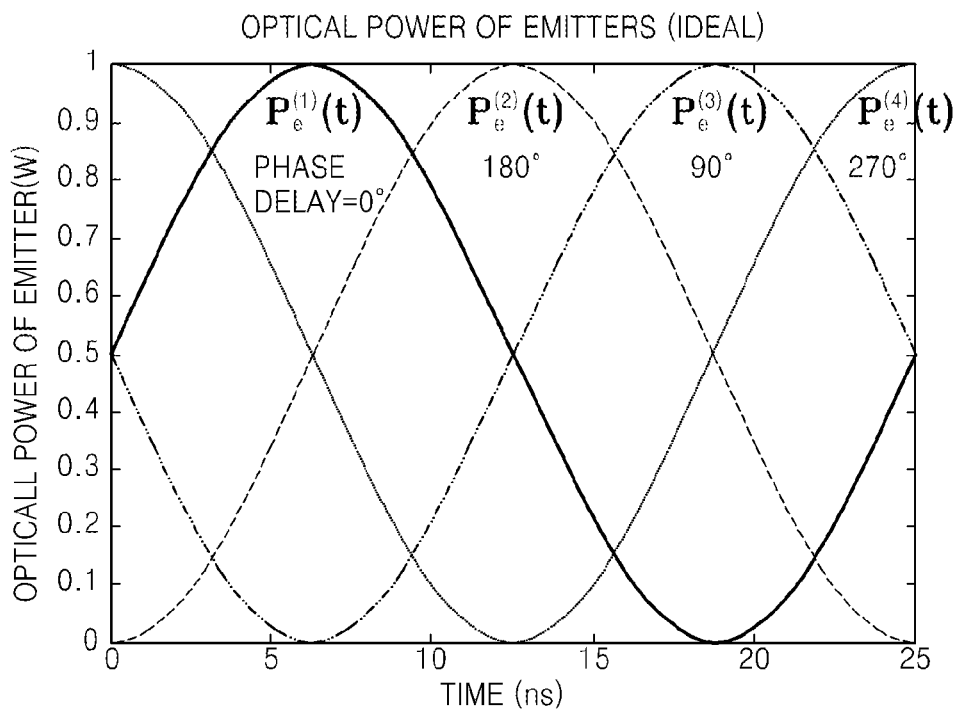
FIGS. 6A and 6B are graphs for explaining output waveforms of a light source and a light modulator according to another embodiment.
Figure 6B:
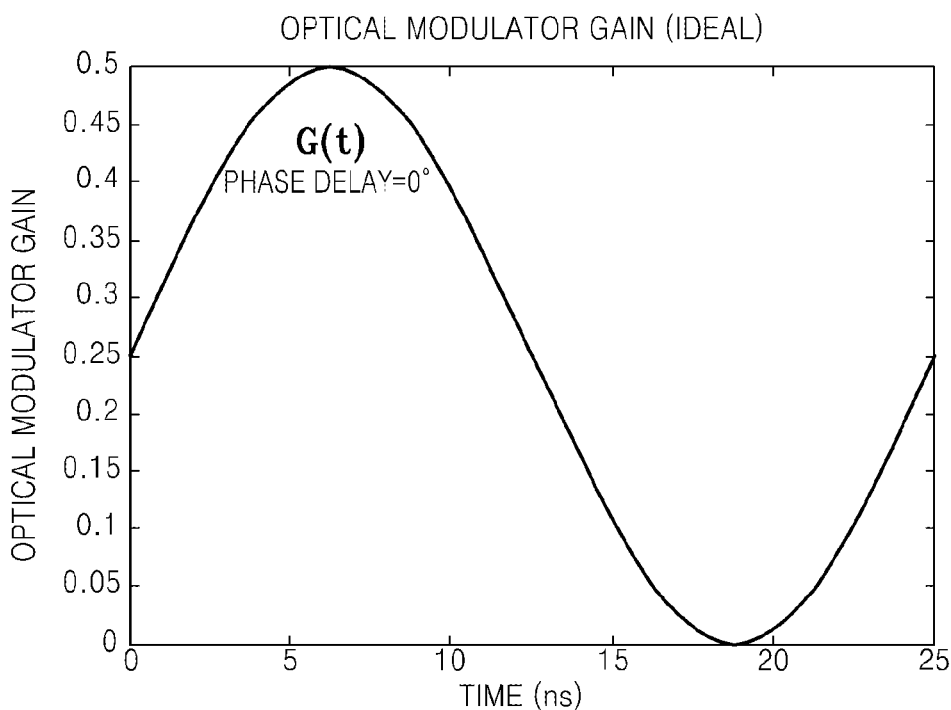

FIG. 5 illustrates a flow of an optical process according to another embodiment. FIGS. 6A and 6B are graphs for explaining output waveforms of a light source and a light modulator according to another embodiment.

Referring to FIGS. 5, 6A, and 6B, an optical processing operation of infrared light in the 3D image acquisition apparatus 100 is illustrated. Infrared light that has transmitted through an IR filter (e.g., a central wavelength of 850 nm) arrives at the light modulator 103 and is modulated to arrive at the capturing device 105 at a rear end of the 3D image acquisition apparatus 100. This series of optical processes are developed as described below.

FIG. 6A is a waveform diagram of a light output waveform, and FIG. 6B is a driving waveform diagram of a light modulator. The waveform may be various periodic waves, such as a sine wave, a square wave, or a ramp wave. For convenience, a formula for an embodiment where a light output wave (light transmission signal) is a square wave and a driving waveform of a light modulator is a sine wave will be described. Further, variables and symbols are defined as follows:

$P_e^{(s)}$ s-th Emitting Light Optical Power $\theta^{(s)}$ Phase Shift of the s-th Emitting Light $\overline{P}_{ave}$ Emitting Light DC offset $P_r^{(s)}$ s-th Receiving Light Optical Power $\overline{P}_a$ Receiving Ambient Light r Light Attenuation of the Object Surface G Shutter Gain $\overline{G}_{ave}$ Shutter Gain DC offset ω Operating Frequency $\phi_{TOF}$ Phase Delay due to TOF (Time of Flight)

Infrared light output (or light transmission signal) is a square wave form, and may be defined in Equation 4 below:

$$P_e^{(s)}(t)=a \cdot \text{rect}(\omega t-\theta^{(s)})+\overline{P}_{ave}, \quad s=1,2,\ldots,4 \quad \text{[Equation 4]}$$

In other words, the infrared light output is in the form of combination of a square waveform (AC component) with DC offset of output light, which is a DC component. According to the current embodiment, s is 1 to 4 and the infrared light has different phases such as 0 degrees, 180 degrees, 90 degrees, and 270 degrees.

Reflected light that has transmitted through an IR filter is expressed in Equation 5 below:

$$P_r^{(s)}(t)=r[a \cdot \text{rect}(\omega t-\theta^{(s)}-\phi_{TOF})+\overline{P}_{ave}]+r\overline{P}_a \quad \text{[Equation 5]}$$

The reflected light returns after being reflected on a surface of a subject. Thus, the reflected light is in the form of a square of reflectivity r in which surface reflectivity of the subject, a lens size, etc., are in a comprehensive consideration, and a phase difference, due to a TOF method is present, and external light is also present, similar to the infrared light.

A modulation waveform (gain) or a light modulation signal of a light modulator (optical shutter) is expressed in Equation 6 below:

$$G(t)=c \sin(\omega t)+\overline{G}_{ave} \quad \text{[Equation 6]}$$

The light modulation signal is in the form of a combination of a sine wave (AC component) and a DC component.

An optical signal arriving at the capturing device is expressed in Equation 7 below:

$$I_{inst}^{(s)}(t)=P_r^{(s)}(t) \times G(t)=r[a \cdot \text{rect}(\omega t-\theta^{(s)}-\phi_{TOF})+(\overline{P}_{ave}+\overline{P}_a)] \times [c \sin(\omega t)+\overline{G}_{ave}] \quad s=1,2,\ldots,4 \quad \text{[Equation 7]}$$

An output signal (or output image) emitted from the capturing device is in the form obtained by integrating the optical signal of Equation 7, and is expressed as Equation 8 below:

$$I_{CIS}^{(s)} = \frac{1}{T}\int_0^T I_{inst}^{(s)}(t)\,dt = \frac{rac}{2\pi}\left[\int_{\theta^{(s)}+\phi_{TOF}}^{\theta^{(s)}+\phi_{TOF}+\pi}(1)\cdot \sin\omega t\, d\omega t \int_{\theta^{(s)}+\phi_{TOF}+\pi}^{\theta^{(s)}+\phi_{TOF}+2\pi}(-1)\cdot \sin\omega t\, d\omega t\right] + \quad \text{[Equation 8]}$$

$$r(\overline{P}_{ave}+\overline{P}_a)\overline{G}_{ave}=$$

$$\frac{rac}{2\pi}[-\cos(\theta^{(s)}+\phi_{TOF}+\pi)+\cos(\theta^{(s)}+\phi_{TOF})+\cos(\theta^{(s)}+\phi_{TOF}+2\pi)-\cos(\theta^{(s)}+\phi_{TOF}+\pi)]+r(\overline{P}_{ave}+\overline{P}_a)$$

$$\overline{G}_{ave}=\frac{rac}{\pi}[-\cos(\theta^{(s)}+\phi_{TOF}+\pi)+\cos(\theta^{(s)}+\phi_{TOF})]+r(\overline{P}_{ave}+\overline{P}_a)\overline{G}_{ave}=$$

$$r \cdot \frac{2}{\pi}\cdot ac\cdot \cos(\theta^{(s)}+\phi_{TOF})+r\cdot(\overline{P}_{ave}+\overline{P}_a)$$

$$\overline{G}_{ave}=rA\cdot \cos(\theta^{(s)}+\phi_{TOF})+rB$$

$$s=1,2,\ldots,4$$

Four continuously captured images based on Equation 8 are expressed in Equations 9 through 12 below:

$$I_{CIS}^{(0)}=rA \cos \phi_{TOF}+rB \quad \text{[Equation 9]}$$

$$I_{CIS}^{(180)}=-rA \cos \phi_{TOF}+rB \quad \text{[Equation 10]}$$

$$I_{CIS}^{(90)}=-rA \sin \phi_{TOF}+rB \quad \text{[Equation 11]}$$

$$I_{CIS}^{(270)}=rA \sin \phi_{TOF}+rB \quad \text{[Equation 12]}$$

Here, A and B are expressed in Equation 13 below:

$$A = \frac{2}{\pi}\cdot ac, \quad B = (\overline{P}_{ave}+\overline{P}_a)\overline{G}_{ave} \quad \text{[Equation 13]}$$

Even when an output waveform or a light transmission signal of a light source is a sine wave, instead of a square wave, formulas may also be developed similar to the above formulas. In this scenario, A has a different result, as expressed in Equation 14 below:

$$A' = \frac{1}{2}\cdot ac \quad \text{[Equation 14]}$$

In regard to the four images of Equations 9 through 12, when unknown figures r, A, and B are removed to solve the formulas for a phase delay ($\phi_{TOF}$), a phase delay due to a depth may be calculated as shown in Equation 15 below:

$$\phi_{TOF} = \tan^{-1}\left(\frac{-I_{CIS}^{(90)}+I_{CIS}^{(270)}}{I_{CIS}^{(0)}-I_{CIS}^{(180)}}\right) \quad \text{[Equation 15]}$$

In Equations 9 through 15, a still image is assumed. In other words, Equations 9 through 15 are formulas that are established under the assumption of an unchanged subject and surface reflectivity. In particular, Equations 9 through 12 are used in detecting and restoring motion blur.

Figure 7A:
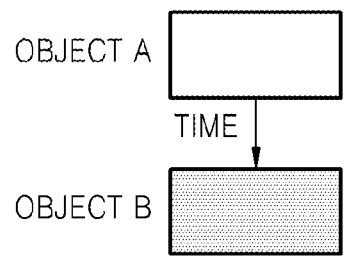
FIGS. 7A and 7B are schematic views for explaining types of motion blur generated in sub-frames captured by using a capturing device according to another embodiment.
Figure 7B:
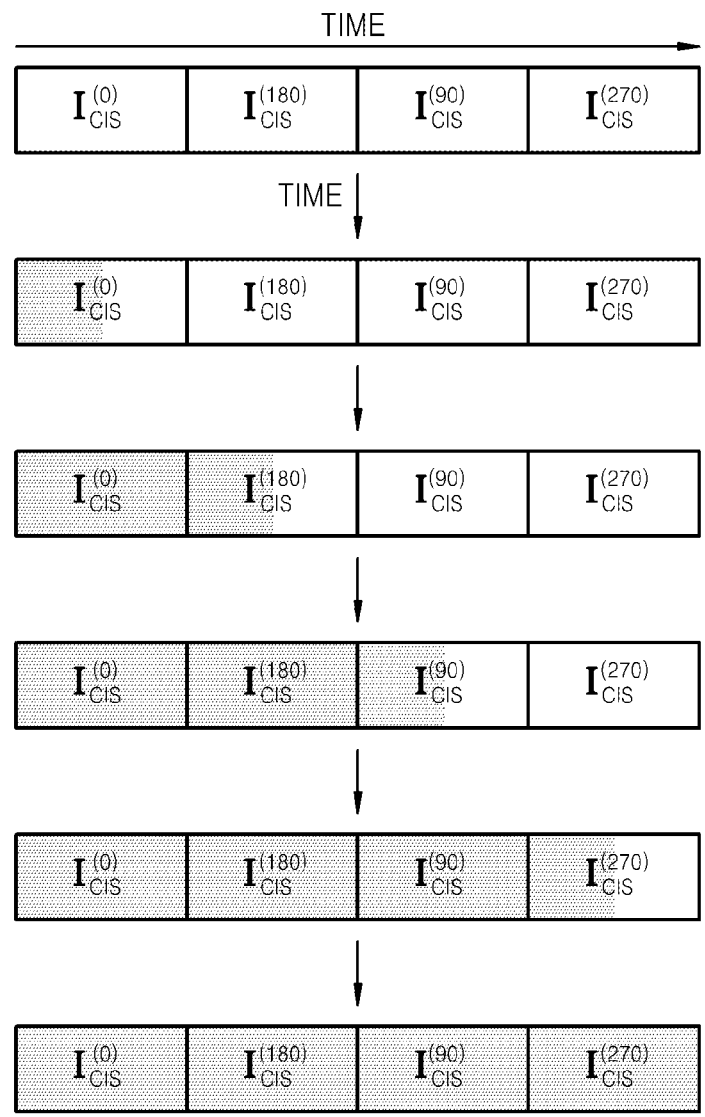

FIGS. 7A and 7B are schematic views for explaining a type of motion blur generated in sub-frames captured by using a capturing device according to another embodiment. A method of detecting a motion blur pixel (image) will be described with reference to FIGS. 7A and 7B.

FIG. 7A illustrates an example where motion blur is generated in a pixel while a subject changes from an object A to an object B. When the 3D image acquisition apparatus 100 sequentially captures four images $I_{CIS}^{(0)}$, $I_{CIS}^{(180)}$, $I_{CIS}^{(90)}$, $I_{CIS}^{(270)}$, motion blur may be divided as illustrated in FIG. 7B. A stable depth image, which is the same as a still image, may be generated without motion blur when four images of the same object, either the object A or the object B is captured (case 0 and case 5), are captured. However, in the four images $I_{CIS}^{(0)}$, $I_{CIS}^{(180)}$, $I_{CIS}^{(90)}$, $I_{CIS}^{(270)}$, motion blur occurs when a change is generated in the object at a predetermined moment (cases 1 through 4). Equations 9 through 11 described above are established in cases 0 and 5 where no motion blur occurs. Thus, whether motion blur has occurred in a predetermined pixel (or image) may be determined based on Equations 9 through 11.

Equation 16 below may be obtained from Equations 9 and 10:

$$I_{CIS}^{(0)}+I_{CIS}^{(180)}=2rB\equiv 2B_1 \quad \text{[Equation 16]}$$

Also, Equation 17 below may be obtained from Equations 11 and 12:

$$I_{CIS}^{(90)}+I_{CIS}^{(270)}=2rB\equiv 2B_2 \quad \text{[Equation 17]}$$

When no motion blur is generated, results of Equations 16 and 17 should be identical. Thus, a discriminant for a motion blur pixel (image) in Equation 18 below (an example where no motion blur occurs) and Equation 19 below (an example where motion blur occurs) may be obtained.

$$(I_{CIS}^{(0)}+I_{CIS}^{(180)})-(I_{CIS}^{(90)}+I_{CIS}^{(270)})=B_1-B_2=0 \quad \text{[Equation 18]}$$

$$|B_1-B_2|\geq \epsilon, \quad \text{[Equation 19]}$$

where $\epsilon$ is a constant which may be appropriately determined according to a noise level of a three-dimensional (3D) image acquisition apparatus or scene.

Figure 8B:
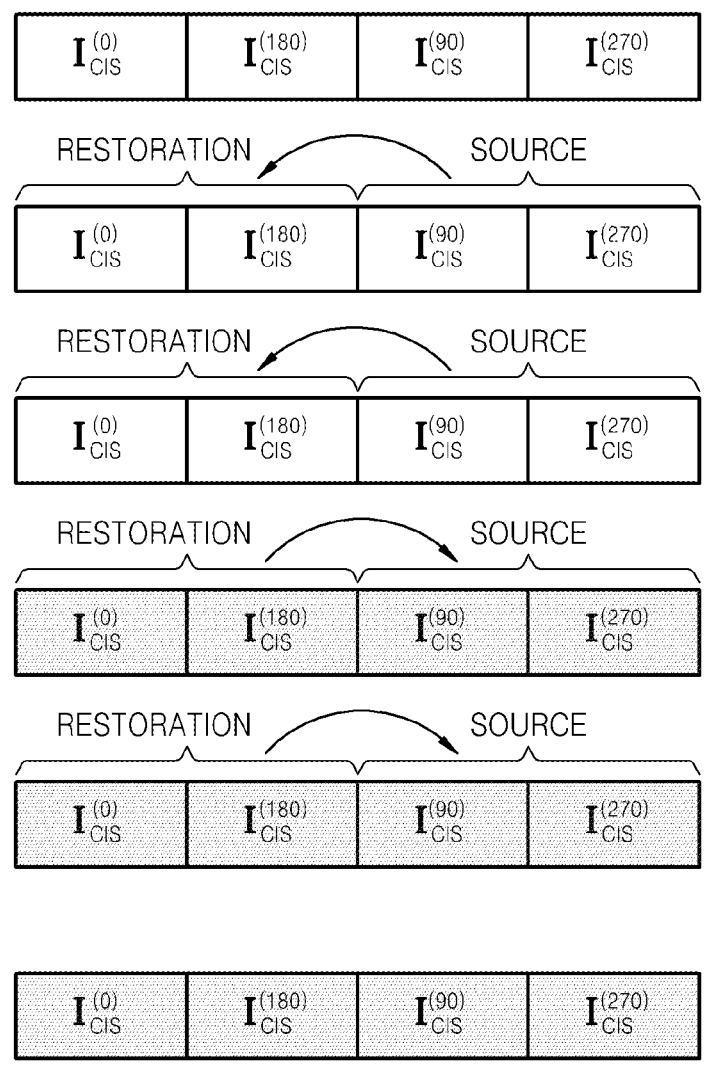

FIGS. 8A and 8B are schematic views for explaining an operation of restoring motion blur by using an image processor according to another embodiment. A method of restoring a motion blur pixel will be described with reference to FIGS. 8A and 8B.

Equation 20 below may be obtained from Equations 9 and 10:

$$(I_{CIS}^{(0)}-I_{CIS}^{(180)})^2=(2rA)^2\cos^2\phi_{TOF} \quad \text{[Equation 20]}$$

Also, Equation 21 below may be obtained from Equations 11 and 12:

$$(I_{CIS}^{(90)}-I_{CIS}^{(270)})^2=(2rA)^2\sin^2\phi_{TOF} \quad \text{[Equation 21]}$$

Equation 22 below may be obtained from Equations 20 and 21:

$$(I_{CIS}^{(0)}-I_{CIS}^{(180)})^2+(I_{CIS}^{(90)}-I_{CIS}^{(270)})^2=(2rA)^2 \quad \text{[Equation 22]}$$

Accordingly, Equation 23 below may be obtained from Equations 16, 17, and 22:

$$(I_{CIS}^{(0)}-I_{CIS}^{(180)})^2+(I_{CIS}^{(90)}-I_{CIS}^{(270)})^2=(2krB)^2=k^2(I_{CIS}^{(0)}+I_{CIS}^{(180)})^2=k^2(I_{CIS}^{(90)}+I_{CIS}^{(270)})^2 \quad \text{[Equation 23]}$$

A constant k refers to a demodulation contrast which indicates modulation characteristics of a TOF system. The constant k is defined by Equation 24 below, and is expressed as a system constant, by a ratio between a variation value of an infrared ray image and a DC offset value. This variation value is a known value measured by calibration before capturing.

$$k=A/B \quad \text{[Equation 24]}$$

As can be seen from Equations 9 through 12, a size of an infrared ray image due to a phase delay is expressed by sine and cosine functions. Further, an AC value and DC offset values are read by floating the functions to experimentally calculate A and B and a ratio k between A and B.

Consequently, $I_{CIS}^{(0)}-I_{CIS}^{(180)}$ may be expressed as in Equations 25 and 26 below based on $I_{CIS}^{(90)}-I_{CIS}^{(270)}$ and the known system constant k:

$$(I_{CIS}^{(0)}-I_{CIS}^{(180)})^2=k^2(I_{CIS}^{(90)}+I_{CIS}^{(270)})^2-(I_{CIS}^{(90)}-I_{CIS}^{(270)})^2 \quad \text{[Equation 25]}$$

$$I_{CIS}^{(0)}-I_{CIS}^{(180)}=\text{sign}(I_{CIS}^{(0)}-I_{CIS}^{(180)})\sqrt{k^2(I_{CIS}^{(90)}+I_{CIS}^{(270)})^2-(I_{CIS}^{(90)}-I_{CIS}^{(270)})^2} \quad \text{[Equation 26]}$$

In contrast, $I_{CIS}^{(90)}-I_{CIS}^{(270)}$ may be expressed in Equations 27 and 28 below based on $I_{CIS}^{(0)}-I_{CIS}^{(180)}$ and the known system constant k:

$$(I_{CIS}^{(90)}-I_{CIS}^{(270)})^2=k^2(I_{CIS}^{(0)}+I_{CIS}^{(180)})^2-(I_{CIS}^{(0)}-I_{CIS}^{(180)})^2 \quad \text{[Equation 27]}$$

$$I_{CIS}^{(90)}-I_{CIS}^{(270)}=\text{sign}(I_{CIS}^{(90)}-I_{CIS}^{(270)})\sqrt{k^2(I_{CIS}^{(0)}+I_{CIS}^{(180)})^2-(I_{CIS}^{(0)}-I_{CIS}^{(180)})^2} \quad \text{[Equation 28]}$$

A phase delay due to TOF according to Equation 15 may be calculated using the restored pixel (image) using Equations 25 through 28. Further, Equations 26 and 28 have complicated formulas and a large amount of computations. Thus, simplified approximation formulas, such as Equations 29 and 30 below, may also be applied:

$$I_{CIS}^{(0)}-I_{CIS}^{(180)}=\text{sign}(I_{CIS}^{(0)}-I_{CIS}^{(180)})|k(I_{CIS}^{(90)}+I_{CIS}^{(270)})-|I_{CIS}^{(90)}-I_{CIS}^{(270)}|| \quad \text{[Equation 29]}$$

$$I_{CIS}^{(90)}-I_{CIS}^{(270)}=\text{sign}(I_{CIS}^{(90)}-I_{CIS}^{(270)})|k(I_{CIS}^{(0)}+I_{CIS}^{(180)})-|I_{CIS}^{(0)}-I_{CIS}^{(180)}|| \quad \text{[Equation 30]}$$

The standards for determining whether motion blur has occurred in $I_{CIS}^{(0)}$ and $I_{CIS}^{(180)}$ (case 1 or case 2 illustrated in FIG. 8A) or in $I_{CIS}^{(90)}$ and $I_{CIS}^{(270)}$ (case 3 or case 4 illustrated in FIG. 8A) will be described. In other words, it is determined in which of the first group ($I_{CIS}^{(0)}$ and $I_{CIS}^{(180)}$) and the second group ($I_{CIS}^{(90)}$ and $I_{CIS}^{(270)}$) motion blur has occurred, and groups or pixels (images) where motion blur is generated may be restored based on Equations 25 through 30.

When an object to be captured is changed, a variation in luminance of an infrared ray image is very large. Thus, a section where motion blur is generated is determined based on Equations 31 and 32 below in consideration of the variation of luminance of an image in each section of cases 1 through 4:

$$(I_{CIS}^{(0)}-I_{CIS}^{(180)})^2>(I_{CIS}^{(90)}-I_{CIS}^{(270)})^2 \quad \text{[Equation 31]}$$

$$(I_{CIS}^{(0)}-I_{CIS}^{(180)})^2<(I_{CIS}^{(90)}-I_{CIS}^{(270)})^2 \quad \text{[Equation 32]}$$

In other words, if Equation 31 is satisfied, it is determined that motion blur has occurred in $I_{CIS}^{(0)}$ or $I_{CIS}^{(180)}$. If Equation 32 is satisfied, it is determined that motion blur has occurred in $I_{CIS}^{(90)}$ or $I_{CIS}^{(270)}$.

As illustrated in FIG. 8B, in case 1 or case 2 (where motion blur occurs in $I_{CIS}^{(0)}$ or $I_{CIS}^{(180)}$), measurement values of $I_{CIS}^{(0)}$ and $I_{CIS}^{(180)}$ (images) are discarded but values restored based on Equation 26 are used. In other words, images including motion blur are restored using images ($I_{CIS}^{(90)}$ and $I_{CIS}^{(270)}$) where no motion blur is generated. In contrast, in cases 3 and 4, as motion blur has occurred in $I_{CIS}^{(90)}$ or $I_{CIS}^{(270)}$, measurement values are discarded but values restored are used based on Equation 28. Accordingly, as illustrated in FIG. 8B, in all of sections where four images are captured, a depth image may be stably generated as if only a single object, either an object 1 or an object 2, is being captured.

Figure 9:
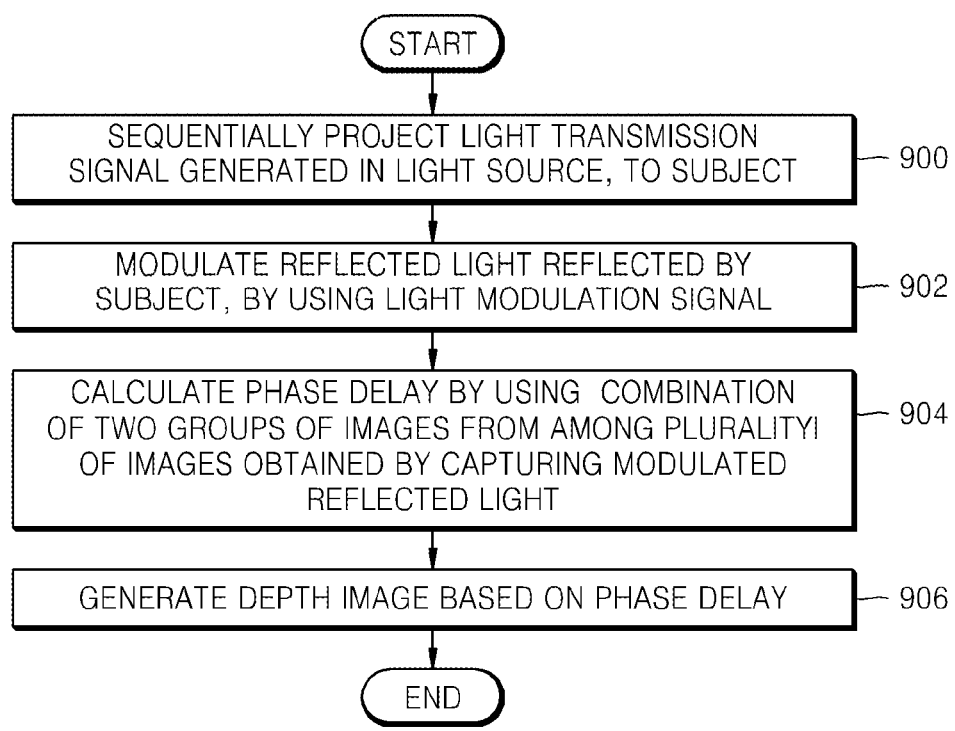
FIG. 9 is a flowchart illustrating a method of generating a depth image by using a 3D image acquisition apparatus, according to another embodiment.

FIG. 9 is a flowchart illustrating a method of generating a depth image in a 3D image acquisition apparatus, according to another embodiment.

Referring to FIG. 9, in operation 900, a plurality of light transmission signals generated in a light source is sequentially transmitted to a subject. The light transmission signal may have different phases, such as 0, 180, 90, and 270 degrees or may have the same phase.

In operation 902, light that is reflected by the subject is modulated using a light modulation signal. When the light transmission signal has different phases, light modulation signals may have the same phase. If the light transmission signal is projected at the same phase, the reflected light is modulated using light modulation signals corresponding to the different phases, i.e., 0, 180, 90, and 270 degrees.

In operation 904, a phase delay is calculated using a combination of two groups of images from among a plurality of images obtained by capturing the modulated reflected light. In operation 902, a phase delay according to a depth is calculated using a combination of two images corresponding to 0 degrees and 180 degrees and two images corresponding to 90 degrees and 270 degrees from among the modulated light.

In operation 906, a depth image is generated based on the phase delay.

FIG. 10 is a flowchart illustrating a method of generating a depth image in a 3D image acquisition apparatus, according to another embodiment.

Referring to FIG. 10, in operation 1000, a plurality of light transmission signals generated in a light source is sequentially projected to a subject. In operation 1002, light reflected by the subject is modulated using a light modulation signal. A light transmission signal from the light source or a light modulation signal from a light modulator may have different phases, such as 0, 180, 90, and 270 degrees or may have the same phases.

In operation S1004, first through fourth images corresponding to phases of the modulated reflected light, i.e., 0, 180, 90, and 270 degrees, are obtained. Further, a first image corresponding to 0 degrees, a second image corresponding to 180 degrees, a third image corresponding to 90 degrees, and a fourth image corresponding to 270 degrees are sequentially obtained. In this case, four images are maintained such that two images (e.g., images corresponding to 90 degrees and 270 degrees) are captured, and two previously captured images (e.g., images corresponding to 0 degrees and 180 degrees) are removed.

In operation 1006, whether a difference, between a sum of images in the first group including the first and second images and a sum of images in the second group including the third and fourth images, is equal to or greater than a first critical value is determined. The first critical value may be optionally determined according to a noise level of system or scenes. In the case of a still image or when motion blur is generated, the sum of images in the first group and the sum of images in the second group are not identical. Thus, when the difference between the first group and the second group is equal to or greater than the first critical value, it indicates that motion blur is present. If there is no motion blur (if the sum of images in the first group and the sum of images in the second group are identical), the method proceeds to operations 1014 and 1016 to calculate a phase delay using the images of the first group and the second group to generate a depth image.

In operations 1008 and 1010, if there is motion blur, it is determined in which of the first group and the second group the motion blur is present. In operation 1006, if there is motion blur in the first through fourth images, it is determined in which of the first group and the second group the motion blur is present. The presence of motion blur indicates a large variation in luminance of an image. Therefore, it is determined that the motion blur is generated in a group with a large variation in luminance. Variation in luminance is determined in a manner above with reference to Equations 31 and 32.

In operation 1012, images of the group with motion blur are restored using the images of the other group. When a depth image is generated by including the images of the group with motion blur, divergence is generated in resultant images. Thus, a totally different result is obtained. Accordingly, a phase delay and a depth image are generated after restoring the images with motion blur. To restore the motion blur, the images of the group with no motion blur and the above-described system variant k are used. The demodulation constant, which is a constant of Equation 24 above, or the system variable k as described above may be measured and calculated in an image test. A size of an image due to a phase delay as in Equations 9 through 12 is expressed by sine and cosine functions, and the image is expressed by a graph to read AC and DC offset values thereof, thereby experimentally calculating A and B and a ratio k therebetween.

In operations 1014 and 1016, a phase delay is calculated and a depth image is generated.

A result of examining the method of removing motion blur according to the current embodiment by applying the same to an actual image will be described. A demodulation constant k of a system was measured, and a depth image was generated using continuous infrared ray images. Examples where motion blur is not removed and motion blur is removed were respectively calculated, thereby comparing the accuracy of the depth image and whether the depth image is converged.

Figure 11A:
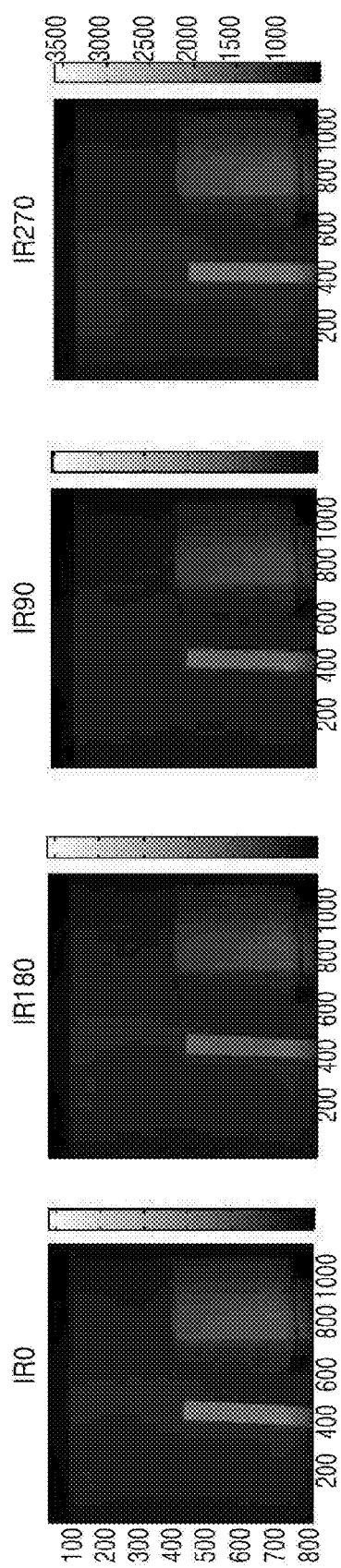
FIGS. 11A and 11B are images for explaining motion blur occurring when capturing a moving subject.
Figure 11B:
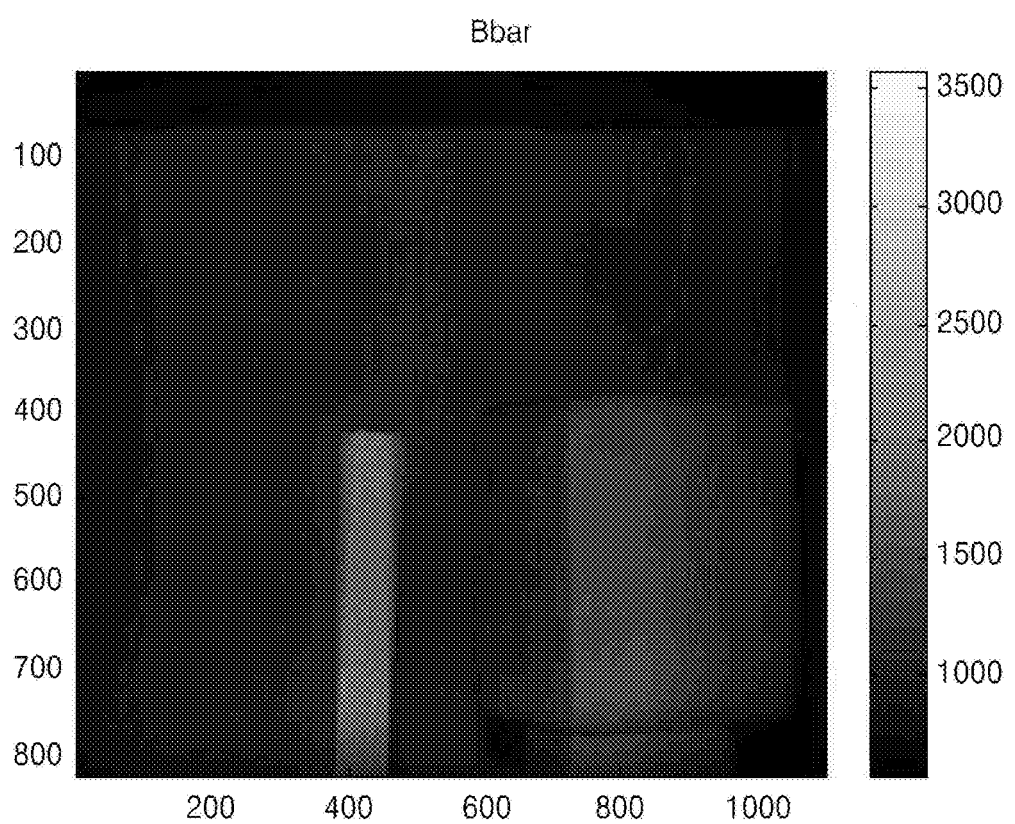

FIGS. 11A and 11B are images for explaining motion blur generated when capturing a moving subject. Referring to FIG. 11A, images corresponding to 0, 180, 90, and 270 degrees are illustrated, showing a bar-shaped object in a rotated state. As can be seen from the overlapped images of FIG. 11B, an image around an edge is blurred.

Figure 12:
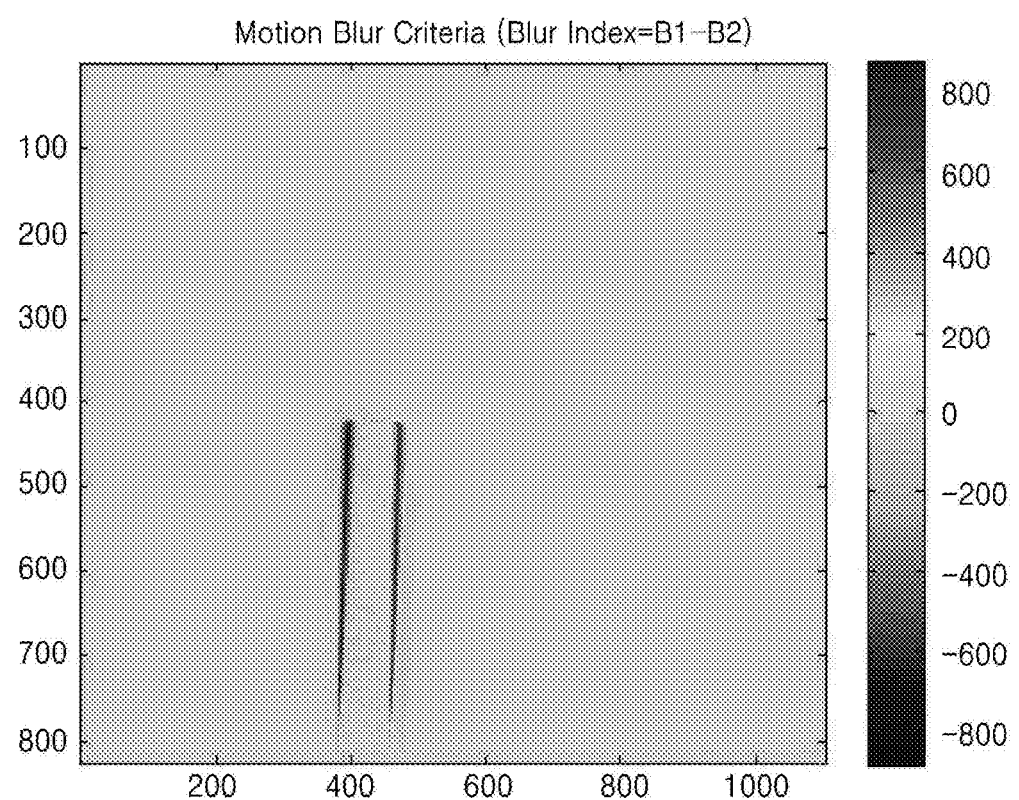
FIG. 12 illustrates a result of applying Equation 19 to the images of FIGS. 11A and 11B in order to determine motion blur according to another embodiment.

FIG. 12 illustrates a result of applying Equation 19 to the images of FIGS. 11A and 11B in order to determine motion blur, according to another embodiment.

FIG. 12 shows a result of applying the discriminant for determining motion blur in Equation 19, to the image illustrated in FIG. 11. The image has mostly 0 values but relatively high values in edge portions thereof, thereby accurately searching motion blurred portions.

Figure 13A:
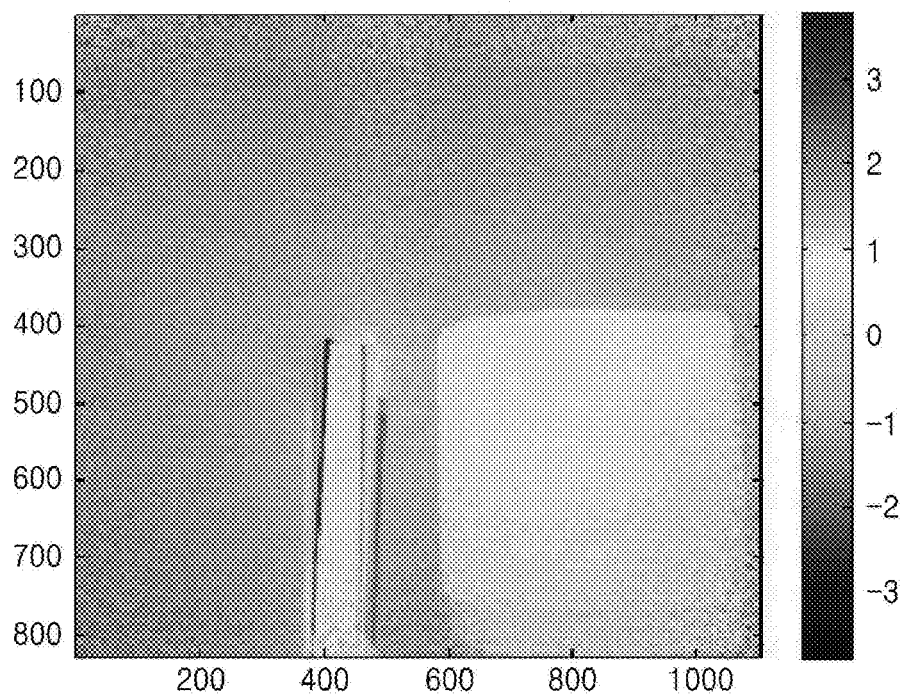
FIGS. 13A and 13B illustrate a depth image in which motion blur is generated and a depth image for which the motion blur is restored, according to another embodiment.
Figure 13B:
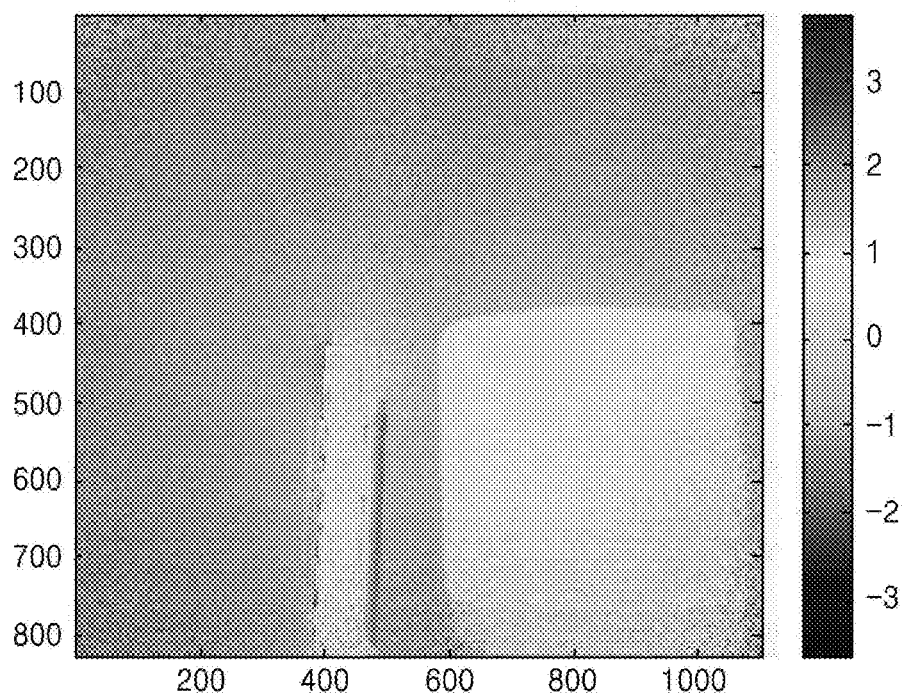

FIGS. 13A and 13B illustrate a depth image in which motion blur is generated and a depth image for which the motion blur is restored, according to another embodiment.

FIG. 13A illustrates an original image before motion blur is restored, and FIG. 13B is an image with restored motion blur according to an embodiment. Referring to edge portions where the motion blur has occurred, the depth image is significantly diverged before a motion blur restoration algorithm is applied. Thus, an unexpected value is given (see FIG. 13A). However, after the algorithm is applied, the depth image is stabilized and a physically meaningful result is given (see FIG. 13B).

According to the 3D image acquisition apparatus of the embodiments, a depth image is generated based on a combination of two groups of images, thereby increasing a rate of capturing the depth image.

Also, according to the 3D image acquisition apparatus according to another embodiment, when a moving object is captured using a TOF method, a depth image is generated after detecting and restoring inevitable motion blur in portions such as an edge. Thus, divergence of the depth image due to the motion blur may be prevented. Also, as a light source, a light modulator, or a capturing device used in related art operations for generating a depth image are used, no additional costs for additional devices are necessary, and additional amount of computation may be reduced.

The device described herein may comprise a processor, a memory for storing program data and executing it, a permanent storage such as a disk drive, a communications port for handling communication with external devices, and user interface devices, including a display, keys, etc. When software modules are involved, these software modules may be stored as program instructions or computer-readable codes executable on the processor on a computer-readable media such as read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the exemplary embodiments, reference has been made to embodiments illustrated in the drawings, and specific language has been used to describe these embodiments. However, no limitation of the scope is intended by this specific language, and the exemplary embodiments should be construed to encompass all embodiments that would normally occur to one of ordinary skill in the art.

Exemplary embodiments may be described in terms of functional block components and various processing steps. Such functional blocks may be realized by any number of hardware and/or software components configured to perform the specified functions. For example, the exemplary embodiments may employ various integrated circuit components, e.g., memory elements, processing elements, logic elements, look-up tables, etc., which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler, etc., with the various algorithms being implemented with any combination of data structures, objects, processes, routines or other programming elements. Functional aspects may be implemented in algorithms that execute on one or more processors. Furthermore, the exemplary embodiments could employ any number of related art techniques for electronics configuration, signal processing and/or control, data processing, etc. The words "mechanism" and "element" are used broadly, and are not limited to mechanical or physical embodiments, but can include software routines in conjunction with processors, etc.

The particular implementations shown and described herein are illustrative examples of the exemplary embodiments and are not intended to otherwise limit the scope in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a", "an", "the" and similar references in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the exemplary embodiments, and does not pose a limitation on the scope unless otherwise claimed. Numerous modifications and adaptations will be readily apparent to those skilled in this art without departing from the spirit and scope of the exemplary embodiments.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of generating a depth image, the method comprising:
    sequentially projecting a light transmission signal, which is generated from a light source, to a subject;
    modulating reflected light, which is reflected by the subject, using a light modulation signal;
    obtaining a first plurality of images from the modulated reflected light, the first plurality of images comprising a first group of a second plurality of images and a second group of the second plurality of images, images in the first group and images in the second group have different phases from one another;
    determining that the first plurality of images comprises a motion blur image in response to a difference between a first sum of intensities of the images in the first group and a second sum of intensities of the images in the second group being greater than or equal to a predetermined value;
    calculating a phase delay using a combination of the first group and the second group of the second plurality of images; and
    generating a depth image based on the phase delay.

2. The method of claim 1, wherein the light transmission signal has different phases, and is sequentially transmitted in an order of 0, 180, 90, and 270 degrees, and
    wherein the phase delay is calculated using the first group which comprises a first image corresponding to 0 degrees and a second image corresponding to 180 degrees, and the second group which comprises a third image corresponding to 90 degrees and a fourth image corresponding to 270 degrees.

3. The method of claim 1, wherein the light modulation signal has different phases, and is sequentially transmitted in an order of 0, 180, 90, and 270 degrees, and wherein the phase delay is calculated using the first group which comprises a first image corresponding to 0 degrees and a second image corresponding to 180 degrees, and the second group which comprises a third image corresponding to 90 degrees and a fourth image corresponding to 270 degrees.

4. The method of claim 1, further comprising:

wherein the modulated reflected light is captured in an order of phases of 0, 180, 90, and 270 degrees, and the first plurality of images comprise a first image corresponding to 0 degrees, a second image corresponding to 180 degrees, a third image corresponding to 90 degrees, and a fourth image corresponding to 270 degrees, and wherein the images in the first group correspond to the first image and the second image, and the images in the second group correspond to the third image and the fourth image is equal to or greater than a first critical value.

5. The method of claim 4, further comprising:

determining a group where the motion blur image is generated, from among the first group and the second group if the motion blur image is generated as a result of the determining, wherein the determining the group where the motion blur image is generated comprises determining that the motion blur image is generated in the group that has a larger range of variation in luminance of images is than the other group from among the first group and the second group.

6. The method of claim 5, further comprising:

restoring the motion blur image, wherein the restoring the motion blur image comprises restoring images of the determined group including the motion blur image, using images of the other group.

7. The method of claim 6, wherein the restoring the motion blur image comprises restoring the motion blur image using the images of the other group and a demodulation constant which is a ratio between an alternating current (AC) variation and a direct current (DC) offset value of an image due to the phase delay.

8. The method of claim 1, wherein the first plurality of images further comprise a first group of a third plurality of images and a second group of the third plurality of images, the third plurality of images are obtained subsequent to the second plurality of images, and a first depth image is generated by calculating the phase delay with respect to the first group and the second group of the second plurality of images, and a second depth image is generated by calculating the phase delay with respect to the second group of the second plurality of images and the first group of the third plurality of images.

9. A method of generating a depth image, the method comprising:

sequentially projecting a light transmission signal, which is generated in a light source, to a subject;

modulating reflected light, which is reflected by the subject, using a light modulation signal;

obtaining a first image corresponding to 0 degrees, a second image corresponding to 180 degrees, a third image corresponding to 90 degrees, and a fourth image corresponding to 270 degrees, wherein 0 degrees, 180 degrees, 90 degrees, and 270 degrees are phases of the modulated reflected light;

determining whether a motion blur image generated by motion of the subject is present by determining whether a difference between a first sum of images in a first group which comprises the first image and the second image and a second sum of images in a second group which comprises the third image and the fourth image is equal to or greater than a first critical value;

determining, when there is a motion blur image, a group including the motion blur image by comparing a difference of images in the first group and a difference of images in the second group, and restoring the images of the group including the motion blur image using images of the other group;

calculating a phase delay using the images of the other group and the images of the restored group; and generating a depth image based on the phase delay.

10. A three-dimensional (3D) image acquisition apparatus comprising:

a light source configured to sequentially project a light transmission signal to a subject;

a light modulator configured to modulate reflected light which is reflected by the subject, using a light modulation signal having a gain waveform;

a capturing device configured to capture the modulated reflected light, which is modulated by the light modulator, to generate a first plurality of images comprising a first group of a second plurality of images and a second group of the second plurality of images, images in the first group and images in the second group have different phases from one another; and a depth image processor configured to determine that the first plurality of images comprises a motion blur image in response to a difference between a first sum of intensities of the images in the first group and a second sum of intensities of the images in the second group being greater than or equal to a predetermined value, calculate a phase delay using a combination of the first group and the second group of the second plurality of image, and generate a depth image based on the phase delay.

11. The 3D image acquisition apparatus of claim 10, further comprising:

a light source driver configured to control a waveform of the light transmission signal by driving the light source;

a light modulator driver configured to control the gain waveform by driving the light modulator; and a controller configured to control operations of the light source driver, the light modulator driver, and the capturing device.

12. The 3D image acquisition apparatus of claim 11, wherein the controller is configured to control the light source driver such that the light transmission signal has different phases, and is sequentially projected in an order of 0, 180, 90, and 270 degrees, wherein the depth image processor is configured to calculate the phase delay using the first group which comprises a first image corresponding to 0 degrees and a second image corresponding to 180 degrees, and the second group which comprises a third image corresponding to 90 degrees and a fourth image corresponding to 270 degrees.

13. The 3D image acquisition apparatus of claim 11, wherein the controller is configured to control the light modulator driver such that the light modulation signal has different phases, and the reflected light is sequentially modulated in an order of 0, 180, 90, and 270 degrees, and wherein the depth image processor is configured to calculate the phase delay using the first group which comprises a first image corresponding to 0 degrees and a second image corresponding to 180 degrees, and the second group which comprises a third image corresponding to 90 degrees and a fourth image corresponding to 270 degrees.

14. The 3D image acquisition apparatus of claim 12, wherein the depth image processor is configured to restore images of the determined group including the motion blur image, using images of the other group and a demodulation constant which is a ratio between an alternating current (AC) variation and a direct current (DC) offset value of an image due to the phase delay.

15. The 3D image acquisition apparatus of claim 12, wherein the first plurality of images further comprises a first group of a third plurality of images and a second group of the third plurality of images, the third plurality of images are obtained subsequent to the second plurality of images, and the depth image processor is configured to generate a first depth image by calculating distances of the first group of the second plurality of images to the subject and the second group of the second plurality of images to the subject, and a second depth image by calculating the phase delay with respect to the second group of the second plurality of images and the first group of the third plurality of images.

16. The 3D image acquisition apparatus of claim 12, further comprising:

a first lens configured to focus the reflected light on a light incident surface of the light modulator within an area of the light modulator;

a filter configured to transmit light having a predetermined wavelength between the first lens and the light modulator, and configured to remove light of wavelengths other than the predetermined wavelength; and a second lens configured to focus the modulated light between the light modulator and the capturing device within an area of the capturing device.

17. The 3D image acquisition apparatus of claim 12, wherein the capturing device comprises at least one of a charge-coupled device (CCD) image sensor which comprises a one-dimensional array or a two-dimensional array, a complementary metal oxide semiconductor (CMOS) image sensor, a photodiode array, and one photodiode, and wherein the capturing device is configured to measure a distance to a single point.

18. The 3D image acquisition apparatus of claim 12, wherein the light source is one of a solid-state light-emitting device which comprises a laser diode (LD) and a light-emitting diode (LED) in an infrared ray band.

19. A method of restoring an image which includes motion blur, the method comprising:

determining whether a motion blur image occurs in a reflected light signal by determining whether a difference between a first sum of images in a first group and a second sum of images in a second group is equal to or greater than a first critical value;

determining a group which comprises the motion blur image by comparing a difference of images in the first group and a difference of images in the second group in response to the motion blur image occurring in the reflected light signal; and restoring images of the group which comprises the motion blur image using images of the other group which is not the group comprising the motion blur image, wherein the first group comprises a first image and a second image of the reflected light signal, and the second group comprises a third image and a fourth image of the reflected light signal, and wherein the first image, the second image, the third image, and the fourth image each have different phases.

20. The method of claim 19, wherein the first image corresponds to 0 degrees, the second image corresponds to 180 degrees, the third image corresponds to 90 degrees, and the fourth image corresponds to 270 degrees.

21. The method of claim 19, wherein the reflected light has been modulated by a light modulation signal.

22. The method of claim 19, wherein the reflected light has been reflected by a subject.

* * * * *